United States Patent
Lopez et al.

(10) Patent No.: US 9,735,851 B2
(45) Date of Patent: Aug. 15, 2017

(54) BEAMFORMING

(71) Applicant: Telefonaktiebolaget L M Ericsson (publ), Stockholm (SE)

(72) Inventors: Miguel Lopez, Solna (SE); Eric Nordström, Stockholm (SE); Henrik Sahlin, Mölnlycke (SE); Mårten Sundberg, Årsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 472 days.

(21) Appl. No.: 14/116,146

(22) PCT Filed: Aug. 2, 2013

(86) PCT No.: PCT/SE2013/050947
§ 371 (c)(1),
(2) Date: Nov. 7, 2013

(87) PCT Pub. No.: WO2014/031062
PCT Pub. Date: Feb. 27, 2014

(65) Prior Publication Data
US 2014/0247818 A1   Sep. 4, 2014

Related U.S. Application Data

(60) Provisional application No. 61/691,420, filed on Aug. 21, 2012.

(51) Int. Cl.
H04B 7/06        (2006.01)
(52) U.S. Cl.
CPC .......... *H04B 7/0617* (2013.01); *H04B 7/061* (2013.01); *H04B 7/0619* (2013.01)
(58) Field of Classification Search
USPC .................................................. 370/337, 328
See application file for complete search history.

(56) References Cited

U.S. PATENT DOCUMENTS

| 6,452,914 B2 * | 9/2002 | Niemela | H04W 28/06 370/337 |
| 7,676,007 B1 * | 3/2010 | Choi | H04B 7/0617 375/267 |
| 2003/0157898 A1 * | 8/2003 | Ylitalo | H04B 7/005 455/67.15 |

(Continued)

FOREIGN PATENT DOCUMENTS

| DE | WO 2011103912 A1 * | 9/2011 | .......... H04B 7/0408 |
| WO | 2004047333 A2 | 6/2004 | |

OTHER PUBLICATIONS

Telecom Dictionary, 2003-2011, Althos Publishing, (www.telecomdictionary.com/index.asp), p. 1.*

(Continued)

*Primary Examiner* — Hanh N Nguyen
*Assistant Examiner* — Jose L Perez
(74) *Attorney, Agent, or Firm* — Patent Portfolio Builders, PLLC

(57) ABSTRACT

The embodiments herein relate to a method in a transmitter for transmitting a data burst to a receiver in a system supporting GSM and/or EGPRS. The transmitter is arranged to make its transmissions with or without beamforming. The transmitter comprises at least two Tx antennas. When the data burst is beamformed, the transmitter transmits the data burst to the receiver through at least one of the at least two Tx antennas. The data burst comprises a common training sequence. When the data burst is non-beamformed, the transmitter transmits the data burst to the receiver through each of the at least two Tx antennas. The data burst comprises a respective antenna specific training sequence.

34 Claims, 18 Drawing Sheets

(56) References Cited

U.S. PATENT DOCUMENTS

| | | | |
|---|---|---|---|
| 2005/0265275 A1* | 12/2005 | Howard | H04B 7/0417 370/328 |
| 2008/0049791 A1* | 2/2008 | Tirkkonen | H04B 7/0634 370/491 |
| 2008/0075021 A1* | 3/2008 | Rofougaran | H04B 7/0617 370/277 |
| 2008/0232504 A1* | 9/2008 | Ma | H04L 5/005 375/267 |
| 2009/0238303 A1 | 9/2009 | Mondal et al. | |
| 2010/0064193 A1* | 3/2010 | Huschke | H04B 7/0689 455/73 |
| 2011/0134908 A1* | 6/2011 | Almalki | H04W 72/1215 370/352 |

OTHER PUBLICATIONS

Search Networking, Aug. 1, 2012, WaybackMachine, (web.archive.org/web/20120801023453/http://searchnetworking.techtarget.com/definition/beamforming), p. 3 Paragraphs 1-2.*

Joanie Wexler, Dec. 17, 2008, Network World, "The role of beam-forming in 11n", (www.networkworld.com/article/2270718/wireless/the-role-of-beam-forming-in-11n.html), p. 1 Paragraph 3.*

Author Unknown, "3GPP TS 45.002: Multiplexing and Multiple Access on the Radio Path (Release 10)," 3rd Generation Partnership Project (3GPP): Technical Specification Group GSM/EDGE Radio Access Network, Mar. 2012, V10.3.0, 112 pages.

Author Unknown, "MIMO Concepts for EGPRS," 3GPP TSG GERAN #54, Agenda Items 6.1, 7.1.5.4, Nokia Siemens Networks Oy, May 14-18, 2012, 7 pages, Sanya, P.R. China.

Dahlman, Erik et al., "4G LTE/LTE-Advanced for Mobile Broadband," Copyright: 2011, pp. cover, inside cover, 153-168, Academic Press, Oxford, United Kingdom.

Plicanic, Vanja et al., "Performance of Handheld MIMO Terminals in Noise- and Interference-Limited Urban Macrocellular Scenarios," IEEE Transactions on Antennas and Propagation, vol. 60, No. 8, Aug. 2012, pp. 3901-3912.

Kuchar, Alexander et al., "Real-Time Smart Antenna Processing for GSM1800 Base Station," 1999 IEEE 49th Vehicular Technology Conference, vol. 1, Copyright: 1999, pp. 664-669.

Mietzner, Jan et al., "Compatible Improvement of the GSM/EDGE System by Means of Space-Time Coding Techniques," IEEE Transactions on Wireless Communications, vol. 2, No. 4, Jul. 2003, pp. 690-702.

International Search Report and Written Opinion for PCT/SE2013/050947, mailed Nov. 6, 2013, 10 pages.

* cited by examiner

BEAMFORMING

This application is a 35 U.S.C. §371 national phase filing of International Application No. PCT/SE2013/050947, filed Aug. 2, 2013, the disclosure of which is incorporated herein by reference in its entirety.

TECHNICAL FIELD

Embodiments herein relate generally to a transmitter, a method in the transmitter, a receiver and a method in the receiver. More particularly the embodiments herein relate to handling a data burst in a system.

BACKGROUND

In a typical cellular network, also referred to as a wireless communication system, a User Equipment (UE), communicates via a Radio Access Network (RAN) to one or more Core Networks (CNs).

A user equipment is a device by which a subscriber may access services offered by an operator's network and services outside the operator's network to which the operator's radio access network and core network provide access, e.g. access to the Internet. The user equipment may be any device, mobile or stationary, enabled to communicate over a radio channel in the communications network, for instance but not limited to e.g. terminal, mobile station, mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket storable, hand held, computer comprised, or vehicle mounted user equipments, enabled to communicate voice and/or data, via the radio access network, with another entity, such as another user equipment or a server.

User equipments are enabled to communicate wirelessly with the network. The communication may be performed e.g. between two user equipments, between a user equipment and a regular telephone and/or between the user equipment and a server via the radio access network and possibly one or more core networks and possibly the Internet.

The network covers a geographical area which is divided into cell areas, and may therefore also be referred to as a cellular network. Each cell area is served by a base station, e.g. a Radio Base Station (RBS), which sometimes may be referred to as e.g. evolved Node B (eNB), eNodeB, NodeB, B node, or Base Transceiver Station (BTS), depending on the technology and terminology used. The base stations communicate over the air interface operating on radio frequencies with the user equipments within range of the base stations.

Multiple Input Multiple Output (MIMO) and beamforming technologies are very important in modern wireless communications systems because they offer the possibility to increase spectrum efficiency and peak rates. Multi-user MIMO has already been standardized in Global System for Mobil Communications (GSM), in a feature called Voice services over Adaptive Multi-user channels on One Slot (VAMOS), which introduced two layer transmission and reception. This technique addresses only Circuit Switched (CS) speech services. Recently, single user MIMO for Enhanced General Packet Radio Service (EGRPS) was proposed as a way to evolve the GSM/Enhanced Data rates for Global Evolution (EDGE) radio access network. A layer refers to a data stream in the context of MIMO. In Multi-user MIMO the base station transmits multiple streams to multiple user equipments. In single-user MIMO, the base station transmits multiple streams on one user equipment.

Multi-standard Radio Frequency (RF) and digital platforms are becoming common in both base stations and user equipments. Moreover, the chipsets of both the base station and the user equipment often support transmission (Tx) and/or reception (Rx) antenna diversity. Hence, hardware support for MIMO and beamforming technologies is already available or expected to be available in the near future as a significant portion of the GSM network and user equipments. Given the scarcity of the radio frequency spectrum and the potential of MIMO and beamforming to increase spectrum efficiency, it is clearly desirable to apply such techniques to speech services in GSM. Moreover, MIMO and beamforming techniques in GSM should be backward compatible, to a very large extent, with the current GSM air interface. This backward compatibility will result in faster time to market and diminished development costs of the features required in both network equipment and user equipment.

A straightforward implementation of MIMO for EGPRS that is to a large extent backwards compatible with the GSM/EDGE air interface is seen in FIG. 1. Each layer is independently coded and modulated according to an EGPRS modulation and coding scheme. Each layer is assigned a different training sequence. The standardized VAMOS training sequence pairs are proposed after a straightforward mapping of the training bit sequence to antipodal 8 Phase-Shift Keying (PSK) symbols. Thus, the transmitter comprises two parallel EGPRS modulators each modulator being fed its own data stream and training sequence.

In FIG. 1, the EGPRS/EGPRS2 transmitter 100 comprises the two parallel EGPRS modulators 101. The input to one of the EGPRS modulators 101 is user code bits for layer 1 and a training sequence for layer 1. The output is a baseband signal for layer 1, which is transmitted through a Tx antenna 103. The input to the other EGPRS modulator 101 is user code bits for layer 2 and a training sequence for layer 2. The output is a baseband signal for layer 2, which is transmitted through another Tx antenna 103.

Closed Loop MIMO in Long Term Evolution (LTE)

Closed loop MIMO technologies have been standardized in LTE. In particular, LTE supports codebook-based precoding. LTE requires the calculation of three feedback quantities at the receiver, namely Channel Quality Indicator (CQI), Precoding Matrix Indicator (PMI) and Rank indicator (RI), in order to perform channel adaptation at the transmitter. At least one of the CQI, PMI and RI may be comprised in Channel State Information (CSI). The CQI is used to select a modulation and coding scheme. The PMI is used to select the codebook index. The RI indicates the preferred number of layers, i.e. data streams. Since the coherence time of the radio channel is in the order of a few milliseconds (ms), LTE has been designed to support fast feedback. The aim of closed loop spatial multiplexing transmission modes in LTE is to adapt the transmission to the current (instantaneous) channel conditions. Channel state information just a few sub-frames old (1 sub-frame has duration of 1 ms) may be already obsolete. The periodicity of the feedback loop is configurable and it is typically in the order of a few ms. In LTE, each base station transmits antenna sends Cell specific Reference Signals (CRS) which are used for CQI measurement, PMI and RI estimation, mobility measurements as well as for demodulation of control signaling. There are up to four CRS patterns corresponding to antenna ports from 0 to 3. The CRS patterns on diverse antenna ports are orthogonal to each other in the sense that they do not overlap with each other or with user equipment signals in time or frequency domains. The cell specific reference signals are not precoded.

Precoding may be seen as a generalization of beamforming to support multi-stream/multi-layer transmission in multi-antenna wireless communications. In single-stream beamforming, the same signal is emitted from each of the Tx antennas with appropriate weighting (phase and gain) such that the signal power is maximized at the receiver output. When the receiver has multiple antennas, single-stream beamforming cannot simultaneously maximize the signal level at all of the Rx antennas, so multi-stream transmission may be used. In point-to-point systems, precoding means that multiple data streams are emitted from the Tx antennas with independent and appropriate weightings such that the link throughput is maximized at the receiver output. In multi-user MIMO, the data streams are intended for different user equipments and some measure of the total throughput (e.g., the sum performance or max-min fairness) is maximized.

Reconfigurable Multiple Antennas in the Receiver

Recent measurement campaigns on MIMO channels have revealed the potential benefits in capacity performance that may be obtained by adapting the antenna configuration at the receiver. The results show that choosing the best among three possible antenna configurations at the receiver along 20 m route sections, leads to significant gains. The speed of the receiver did not exceed 30 km/h, and the frequency band was 2.65 GHz. This means that the best antenna configuration was kept fixed during time intervals of 2.4 or longer. It is reasonable to expect that when the measurements had been performed in the 900 MHz band, the same gains would have been obtained by keeping the antenna configuration fixed during time intervals longer than 2.4 s, perhaps up to 7 s.

Spectrum and power efficiencies are of paramount importance in wireless communications. Therefore, it is desirable to implement closed loop beamforming techniques for both circuit switched and Packet Switched (PS) services in GSM. Moreover, when beamforming for these services in GSM is to be standardized and deployed, it is important to ensure that it is designed to maximize the link performance, while maintaining, to a large extent, backwards compatibility with the GSM air interface.

Closed loop techniques such as those used in LTE and other wireless technologies are very promising, but cannot be applied to an enhancement of GSM with beamforming, because the GSM air interface does not support the low latency required by the fast feedback channels. In other words, the gains brought about by the closed loop beamforming techniques standardized in LTE cannot be achieved in a GSM system. Moreover, in LTE the Tx antennas in the base station broadcast cell specific reference signals which are essential for the receiver in order to compute the CQI, PMI and RI. Such signals are not available in the current GSM/EDGE air interface.

SUMMARY

An objective of embodiments herein is therefore to overcome at least one of the above disadvantages and to provide improved beamforming in a communications system According to a first aspect, the object is achieved by a method in a transmitter for transmitting a data burst to a receiver in a system supporting GSM and/or EGPRS. The transmitter is arranged to make its transmissions with or without beamforming. The transmitter comprises at least two Tx antennas. When the data burst is beamformed, the transmitter transmits the data burst to the receiver through at least one of the at least two Tx antennas, and the data burst comprises a common training sequence. When the data burst is non-beamformed, the transmitter transmits the data burst to the receiver through each of the at least two Tx antennas, and the data burst comprises a respective antenna specific training sequence.

According to a second aspect, the object is achieved by a method in a receiver for receiving a data burst from a transmitter in a system supporting GSM and/or EGPRS. When the data burst is beamformed, the receiver receives the data burst transmitted from the transmitter through at least one of at least two Tx antennas of the transmitter, and the data burst comprises a common training sequence. When the data burst is non-beamformed, the receiver receives the data burst transmitted from the transmitter through each of the at least two Tx antennas of the transmitter, and the data burst comprises a respective antenna specific training sequence.

According to a third aspect, the object is achieved by a transmitter which is arranged to transmit a data burst to a receiver in a system supporting GSM and/or EGPRS. The transmitter is arranged to make its transmissions with or without beamforming. The transmitter comprises at least two Tx antennas. When the data burst is beamformed, the transmitter is arranged to transmit the data burst to the receiver through at least one of the at least two Tx antennas, and the data burst comprises a common training sequence. When the data burst is non-beamformed, the transmitter is arranged to transmit the data burst to the receiver through each of the at least two Tx antennas, and the data burst comprises a respective antenna specific training sequence.

According to a fourth aspect, the object is achieved by a receiver arranged to receive a data burst from a transmitter in a system supporting GSM and/or EGPRS. The receiver comprises at least one Rx antenna. When the data burst is beamformed, the at least one Rx antenna is arranged to receive the data burst transmitted from the transmitter through at least one of at least two Tx antennas of the transmitter, and the data burst comprises a common training sequence. When the data burst is non-beamformed, the at least one Rx antenna is arranged to receive the data burst transmitted from the transmitter through each of the at least two Tx antennas of the transmitter, and the data burst comprises a respective antenna specific training sequence.

The embodiments herein address transmission and reception techniques for multiple antenna transmitters and multiple antenna receivers in GSM and/or EGPRS. The embodiments herein are related to the physical layer.

The embodiments herein introduce beamforming transmission and reception techniques for an evolved GSM and/or EGPRS air interface supporting multiple transmitter antennas and one or more receiver antennas.

A beamformer is a set of beamforming weights applied to the transmitted signals. The beamforming weights are chosen from a codebook (in the transmitter), or estimated from a codebook (in the receiver). In the following, the verb beamform is used to refer to a case when a beamformer is used. The term beamformer may also be used when referring to a unit, in a network node, which applies beamforming.

Embodiments herein afford many advantages, of which a non-exhaustive list of examples follows:

An advantage of the embodiments herein is that they improve the spectrum efficiency of the system and lower the energy consumption on the transmitter side. The embodiments herein target both circuit switched voice services and packet switched data services and has the advantage that they are to a large extent backwards compatible with the GSM/EGPRS air interface.

The embodiments herein have an advantage of enhancing a GSM/EGPRS system with closed loop beamforming, providing better link performance and increasing the spectrum efficiency. Another advantage is that no new fast feedback channels or cell specific reference signals are needed. The embodiments herein are useful with stationary receivers, or receivers moving at low speeds.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
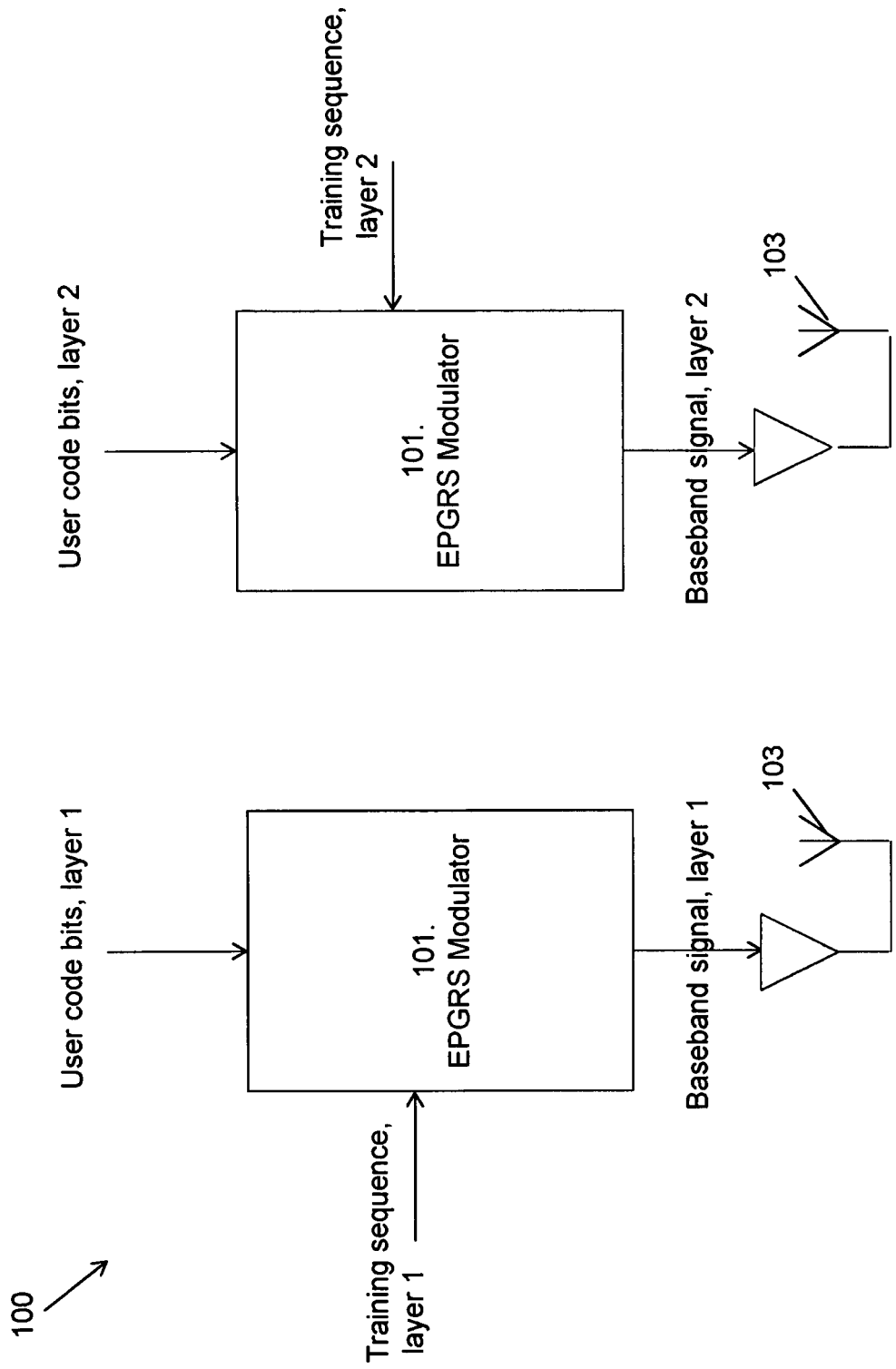
FIG. 1 is a schematic block diagram illustrating embodiments of a MIMO EGPRS/EGPRS2 transmitter.
Figure 2:
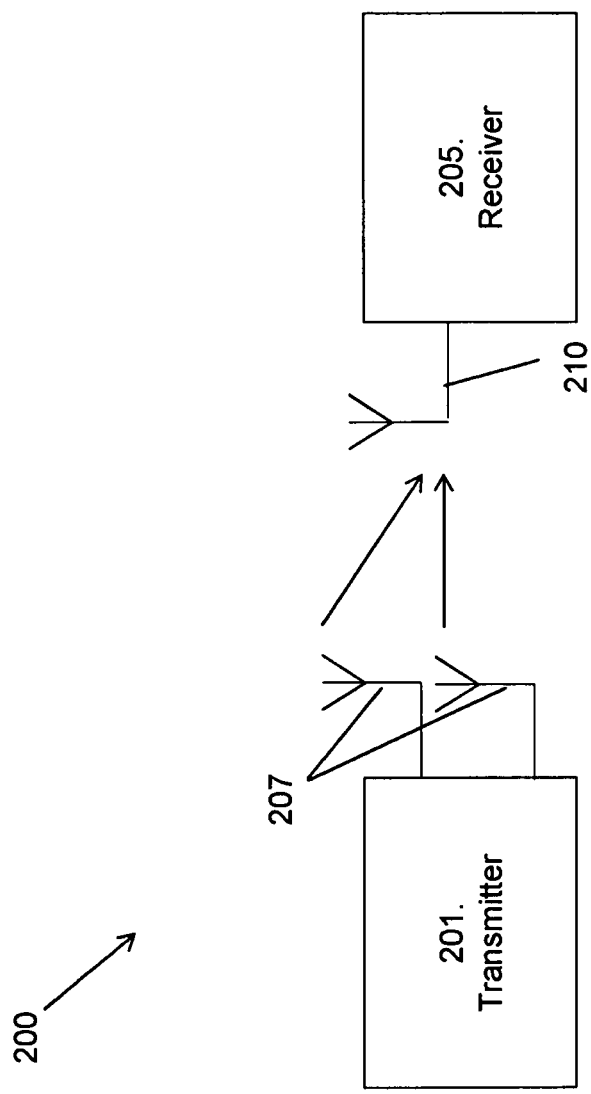
FIG. 2 is a schematic block diagram illustrating embodiments of a communications network.

FIG. 2 depicts a system 200 in which embodiments herein may be implemented. The system 200 may in some embodiments apply to one or more radio access technologies such as for example GSM or EDGE/EPGRS, or any other suitable radio access technology. EGPRS may include EGPRS2 and further enhancements of EGPRS.

The system 200 comprises a transmitter 201 configured to communicate with a receiver 205. The transmitter 201 comprises at least two Tx antennas 207 configured to transmit for example data bursts. Note that no restriction or assumptions are made on the Tx antennas 207. In the case of two TX antennas 207, the antennas may be spatially separated, or they may be co-located but endowed with different polarizations. The receiver 205 comprises at least one Rx antenna 210 configured to receive for example data bursts from the transmitter 201.

The term burst transmission or data burst may be described as any relatively high-bandwidth transmission over a short period. The term may also be used in a number of contexts to mean a specific amount of data sent or received in one intermittent operation. It may be contrasted with streamed, paced, or continuous. Generally, a data burst operation implies that some threshold has been reached that triggers the data burst.

Depending on the particular technology, a data burst operation may be intermittent at a regular or an irregular rate.

In some embodiments, the transmitter 201 is associated with a base station such as a NodeB, an evolved NodeB, or any other network unit capable to communicate with the receiver 205. The transmitter 201 may be comprised in the base station or connected to and located in the proximity of the base station. In some embodiments, the transmitter 201 is associated with a user equipment, which may be any device, mobile or stationary, enabled to communicate over the radio channel in the communications network, for instance but not limited to e.g. terminal, mobile station, mobile phone, smart phone, tablet, sensors, meters, vehicles, household appliances, medical appliances, media players, cameras, or any type of consumer electronic, for instance but not limited to television, radio, lighting arrangements, tablet computer, laptop, or PC. The transmitter 201 may be comprised in the user equipment or connected to and located in the proximity of the user equipment.

In some embodiments, the receiver 205 is associated with a base station such as a NodeB, an evolved NodeB, or any other network unit capable to communicate over with the transmitter 201. The receiver 205 may be comprised in the base station or Connected to and located in the proximity of the base station. In some embodiments, the receiver 205 is associated with a user equipment, which may be any device, mobile or stationary, enabled to communicate over the radio channel in the communications network, for instance but not limited to e.g. terminal, mobile station, mobile phone, smart phone, tablet, sensors, meters, vehicles, household appliances, medical appliances, media players, cameras, or any type of consumer electronic, for instance but not limited to television, radio, lighting arrangements, tablet computer, laptop, or PC. In some embodiments, the receiver 205 may be comprised in the user equipment or connected to and located in the proximity of the user equipment.

It should be noted that the communication link between the transmitter 201 and the receiver 205 may be of any suitable kind such as a wireless link. The link may use any suitable protocol depending on type and level of layer as understood by the person skilled in the art, e.g. as indicated by the Open Systems Interconnection (OSI) model.

Between a base station that comprises a transmitter and a receiver, and a user equipment that also comprises a transmitter and a receiver a radio channel may be established for the transmission of a data burst by at least one of said base station and said user equipment. In the radio channel, a training sequence having a recognizable symbol sequence is comprised in a data burst transmitted by said at least one of said base station and said user equipment,?

The method for handling data burst in the communications network 200 according to some embodiments will now be described with reference to the signalling diagram depicted in FIG. 103. The method comprises the following steps, which steps may as well be carried out in any other suitable order than described below:

Step 301

The transmitter 201 receives a set of user code bits, i.e. payload.

Step 302a

When a data burst to be transmitted to the receiver 205 should be beamformed, the transmitter 201 applies a common training sequence to the user code bits.

Step 302b

When a data burst to be transmitted to the receiver 205 should be non-beamformed, the transmitter applies an antenna specific training sequence to the user code bits. In other words, there are at least two different training sequences, one training sequence for each Tx antenna 207.

Step 303a

This step is performed after step 302a, and not after step 302b. When the data burst should be beamformed, the transmitter 201 performs beamforming.

Step 304

The transmitter 201 transmits the data burst to the receiver 205. The data burst is beamformed or non-beamformed.

Step 305

When the receiver 205 has received the data burst, it determines the number of training sequences, i.e. it determines whether the number is equal to one or not. When the number of training sequences was determined to be equal to one, the receiver 205 understands that the data burst is beamformed and moves directly to step 307. When the number of training sequence was determined to be different from one, e.g. 2 or 4, the receiver 205 understands that the data burst is non-beamformed and goes via step 306 before executing step 307.

Step 306

When the data burst is non-beamformed, the receiver 205 performs an estimation of an index p in a codebook of the preferred beamformer. The preferred beamformer may also be referred to as a best beamformer.

Step 307

The receiver 205 performs equalization and channel decoding using either the beamformer as indicated in step 305 or using the estimated preferred beamformer indicated by step 306.

The embodiments herein are applicable to both the downlink and the uplink, although it is perhaps more useful in the downlink. It introduces a closed loop beamforming concept for circuit switched and packet switched services in GSM/EGPRS. Unlike LTE, it does not rely on fast feedback. It exploits the fact that for a given data transmission, there may be preferred phases/amplitudes of the transmitted signals that give gains over fixed or random phases, over time periods much larger than the coherence time of the channel. Since the time periods over which the phases/amplitudes are kept constant are of the order of a few seconds, the latency of GSM does not prevent the receiver to provide useful feedback to the transmitter.

The transmitter 201 must be equipped with two or more Tx antennas 207. The characteristics of the radio channel, as perceived by the receiver 205, may be modified from data burst to data burst by using different beamformers. A beamformer is just a set of beamforming weights applied to the transmitted signals. Codebook based beamforming, similar to that used in LTE, is employed. Not all data bursts are beamformed. When the data bursts are non-beamformed, different, at least substantially orthogonal antenna specific training sequences are used for the signals sent through each Tx antenna 207. When beamforming is used, the same common training sequence is used in all transmitted signals.

Since a radio channel changes rapidly, the intersymbol-interference of detected bits caused by signal transmission across the radio channel must be corrected by measuring the impulse response of the channel and by adapting the receiver 205 to the configuration of the channel. This is usually carried out in the communications system so that the base station or the user equipment transmits a known bit configuration in the data burst thereof, i.e. a constant-length sequence of consecutive bits. The sequence is called a training sequence. The receiver 205 has earlier received an encoded piece of information about what kind of bit pattern, that is training sequence, will be transmitted. The receiver 205 correlates with the training sequence corresponding to the training sequence it received and equivalent to the encoded data accessed from the memory. As a result of the correlation, an estimate on the radio path (i.e. delay) is received and the receiver 205 sets the channel equalizer so that the delay distributions are corrected on a given length. A Training Sequence Code (TSC) is one of a plurality of parameters that defines a particular physical channel in a base transceiver station. A training sequence may be a sequence of bits that is known at both the transmitter 201 and the receiver 205. 3GPP defines the "training sequence bits" as modulating bits with states as given in the following table 1 according to the TSC.

TABLE 1

| Training Sequence Code (TSC) | Training sequence symbols (Bit Number 183, Bit Number 184, . . . , Bit Number 260) |
|---|---|
| 0 | (1, 1, 1; 1, 1, 1; 0, 0, 1; 1, 1, 1; 1, 1, 1; 0, 0, 1; 1, 1, 1; 0, 0, 1; 0, 0, 1; 0, 0, 1; 1, 1, 1; 1, 1, 1; 1, 1, 1; 1, 1, 1; 0, 0, 1; 1, 1, 1; 1, 1, 1; 1, 1, 1; 0, 0, 1; 1, 1, 1; 1, 1, 1; 0, 0, 1; 0, 0, 1; 0, 0, 1) |
| 1 | (1, 1, 1; 1, 1, 1; 0, 0, 1; 1, 1, 1; 0, 0, 1; 0, 0, 1; 1, 1, 1; 0, 0, 1; 0, 0, 1; 0, 0, 1; 1, 1, 1; 0, 0, 1; 0, 0, 1; 0, 0, 1; 0, 0, 1; 1, 1, 1; 1, 1, 1; 1, 1, 1; 0, 0, 1; 1, 1, 1; 0, 0, 1; 0, 0, 1; 0, 0, 1; 0, 0, 1) |
| 2 | (1, 1, 1; 0, 0, 1; 1, 1, 1; 1, 1, 1; 1, 1, 1; 1, 1, 1; 0, 0, 1; 0, 0, 1; 0, 0, 1; 0, 0, 1; 1, 1, 1; 0, 0, 1; 0, 0, 1; 0, 0, 1; 1, 1, 1; 0, 0, 1; 1, 1, 1; 1, 1, 1; 0, 0, 1; 1, 1, 1; 1, 1, 1; 1, 1, 1; 1, 1, 1; 0, 0, 1; 0, 0, 1; 0, 0, 1; 0, 0, 1; 1, 1, 1) |
| 3 | (1, 1, 1; 0, 0, 1; 1, 1, 1; 1, 1, 1; 1, 1, 1; 0, 0, 1; 0, 0, 1; 0, 0, 1; 0, 0, 1; 0, 0, 1; 1, 1, 1; 0, 0, 1; 0, 0, 1; 1, 1, 1; 0, 0, 1; 1, 1, 1; 1, 1, 1; 1, 1, 1; 0, 0, 1; 1, 1, 1; 1, 1, 1; 1, 1, 1; 0, 0, 1; 0, 0, 1; 0, 0, 1; 0, 0, 1; 1, 1, 1) |
| 4 | (1, 1, 1; 1, 1, 1; 1, 1, 1; 0, 0, 1; 0, 0, 1; 1, 1, 1; 0, 0, 1; 1, 1, 1; 0, 0, 1; 0, 0, 1; 0, 0, 1; 0, 0, 1; 1, 1, 1; 1, 1, 1; 0, 0, 1; 1, 1, 1; 1, 1, 1; 1, 1, 1; 1, 1, 1; 1, 1, 1; 0, 0, 1; 0, 0, 1; 1, 1, 1; 1, 1, 1; 0, 0, 1; 0, 0, 1) |
| 5 | (1, 1, 1; 0, 0, 1; 1, 1, 1; 1, 1, 1; 0, 0, 1; 0, 0, 1; 0, 0, 1; 1, 1, 1; 0, 0, 1; 1, 1, 1; 1, 1, 1; 0, 0, 1; 0, 0, 1; 1, 1, 1; 1, 1, 1; 1, 1, 1; 1, 1, 1; 1, 1, 1; 0, 0, 1; 1, 1, 1; 1, 1, 1; 0, 0, 1; 0, 0, 1; 0, 0, 1; 1, 1, 1; 0, 0, 1; 1, 1, 1) |
| 6 | (0, 0, 1; 1, 1, 1; 0, 0, 1; 1, 1, 1; 1, 1, 1; 0, 0, 1; 0, 0, 1; 0, 0, 1; 0, 0, 1; 0, 0, 1; 0, 0, 1; 1, 1, 1; 0, 0, 1; 0, 0, 1; 1, 1, 1; 1, 1, 1; 1, 1, 1; 1, 1, 1; 0, 0, 1; 1, 1, 1; 0, 0, 1; 1, 1, 1; 0, 0, 1; 0, 0, 1; 0, 0, 1; 0, 0, 1) |
| 7 | (0, 0, 1; 0, 0, 1; 0, 0, 1; 1, 1, 1; 0, 0, 1; 0, 0, 1; 0, 0, 1; 0, 0, 1; 1, 1, 1; 1, 1, 1; 1, 1, 1; 1, 1, 1; 1, 1, 1; 0, 0, 1; 1, 1, 1; 1, 1, 1; 0, 0, 1; 1, 1, 1; 1, 1, 1; 0, 0, 1; 0, 0, 1; 0, 0, 1; 0, 0, 1; 1, 1, 1; 1, 1, 1) |

The left column of table 1 comprises the training sequence code and the right column comprises the training sequence symbol. The example above is valid for 8PSK modulation, but the definition is identical for all modulations, the difference being the entries in the table 1.

At the receiver side, the receiver 205 blindly detects the use of beamforming by detecting the number of training sequences. Alternatively, the Time Division Multiple Access (TDMA) frame numbers when beamforming is used and not used are signaled by the transmitter 201 (that is, by the network in DownLink (DL) transmissions) to the receiver 205, via signaling channels, at call setup or during the call. When a data burst is not beamformed, the receiver 205 may estimate the preferred beamforming weights among the finite set of beamformers in the codebook. The receiver 205 feeds back long term statistics of the estimated beamformer to the transmitter 201, in a way compatible with existing mechanisms for feedback in GSM.

The embodiments herein pertains beamforming for circuit switched and packet switched services in GSM/EGPRS. The embodiments herein described herein may be applied in both the uplink and downlink.

Previous measurements relate to several physical antenna configurations at the receiver 205. The effect of switching the Rx antenna may be partially obtained by keeping the Rx antenna 210 fixed and changing the phases and/or amplitudes of the signals at the transmitter 201. One way to do this is by applying codebook based beamforming at the transmitter 201, in a fashion similar to LTE. However, unlike LTE, there are no cell specific reference signals in GSM/EGPRS. Instead, the usual GSM/EGPRS training sequences play the additional role of reference signals for beamformer estimation.

For the sake of simplicity the embodiments herein will be described for two Tx antennas 207, but extensions to a larger number of Tx antennas 207 are straightforward.

Now, the transmitter 201 will be described in more detail.

Transmitter

As mentioned earlier, two or more Tx antennas 207 are required. The transmitter 201 may be configured in two different ways, transmitter configuration 1 or transmitter configuration 2.

Transmitter Configuration 1.

Figure 4:
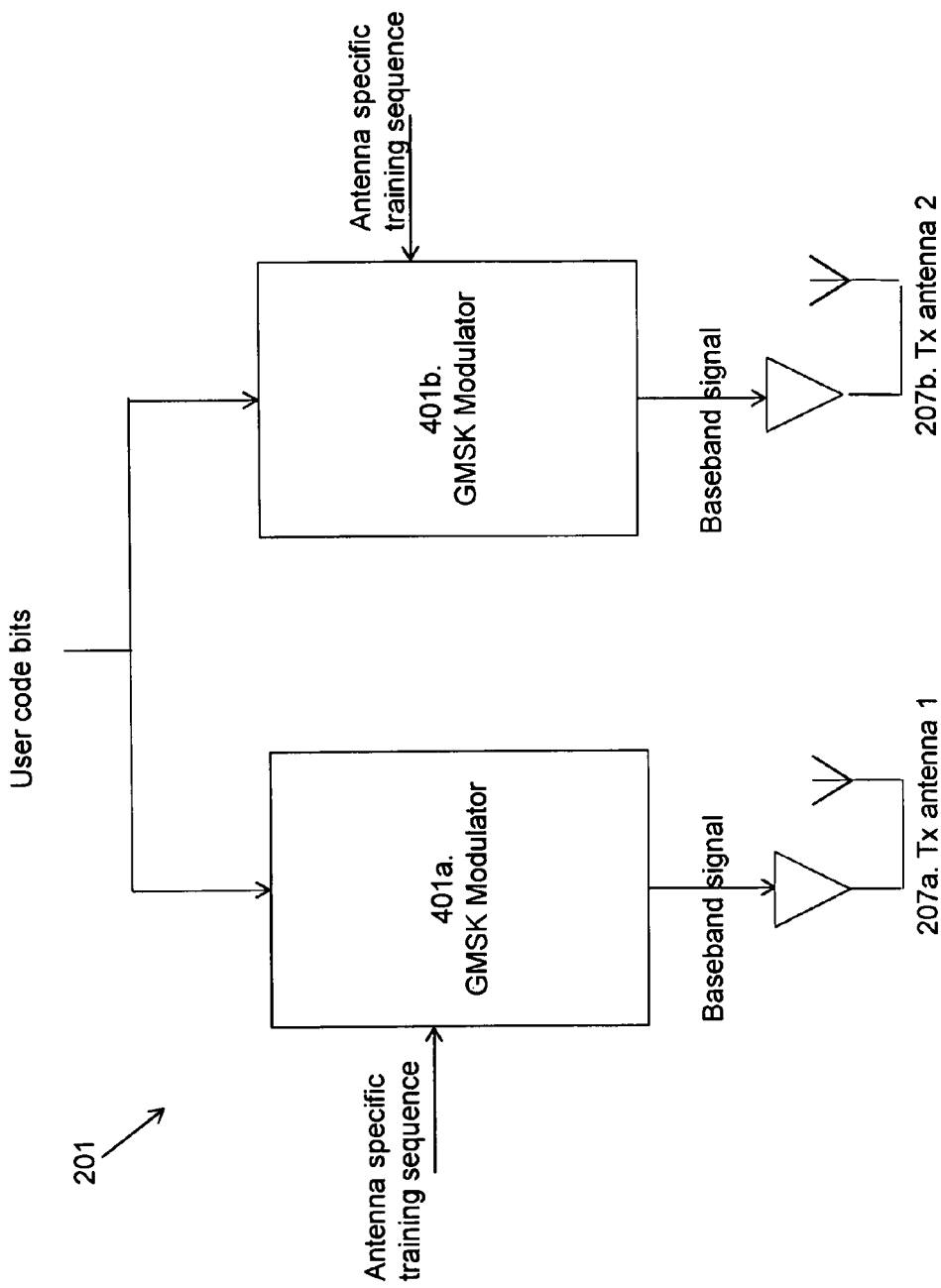
FIG. 4 is a schematic block diagram illustrating embodiments of a Tx configuration 1 for CS or General Packet Radio Service (GPRS), diversity transmitter without beamforming and two at least substantially orthogonal training sequences used.
Figure 5:
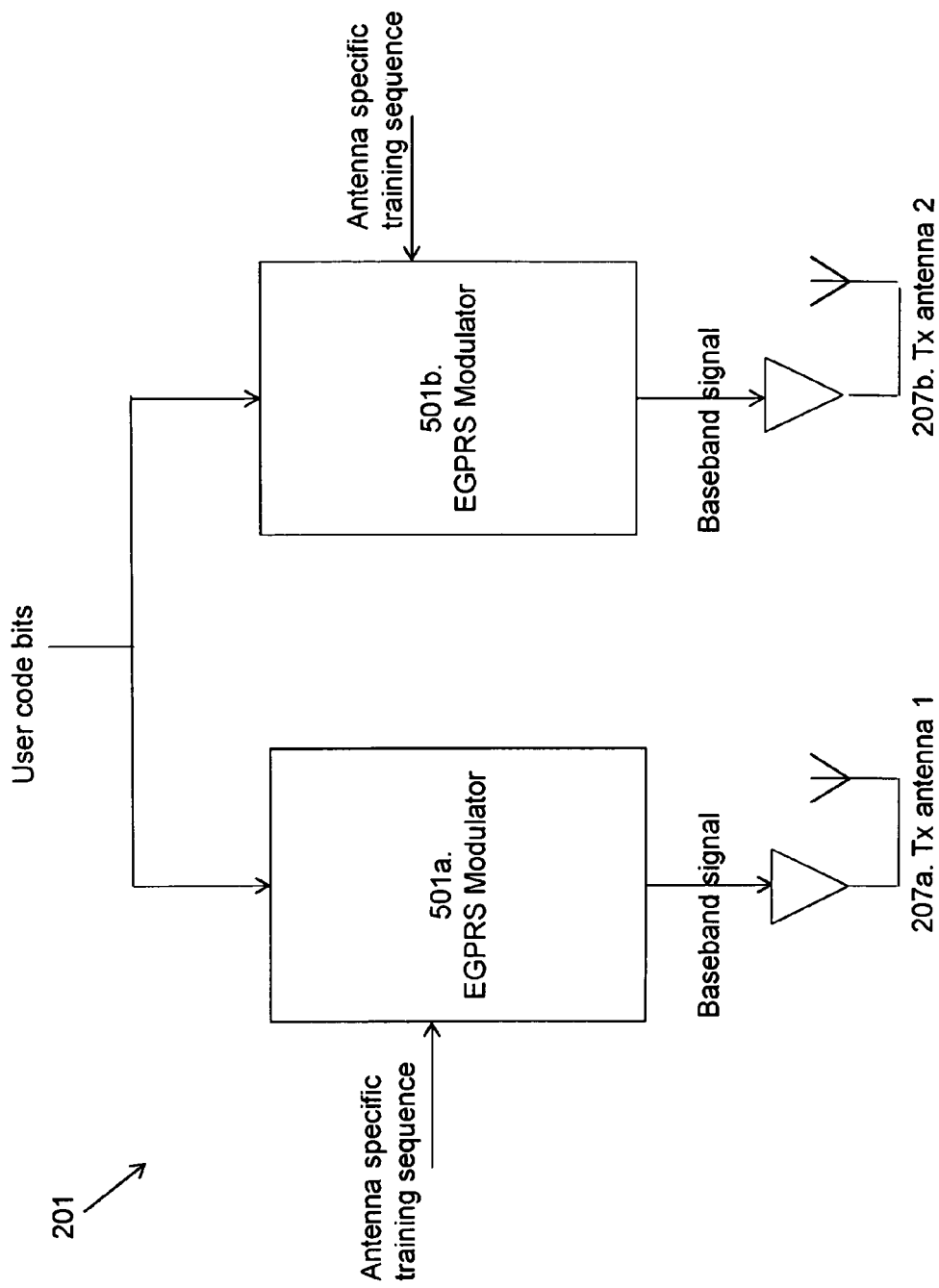
FIG. 5 is a schematic block diagram illustrating embodiments of a Tx configuration 1 for PS, diversity transmitter without beamforming and two at least substantially orthogonal training sequences used.

Some data bursts are transmitted without beamforming, but using two Tx antennas 207. Moreover, each of the transmitted signals will use a different training sequence, preferably at least substantially orthogonal to each other. Since a set of at least substantially orthogonal training sequences for GMSK modulation has been standardized in VAMOS, it is convenient to re-use these training sequences. For other modulation schemes used for PS services (EGPRS/EGPR2) the VAMOS TSCs may also be re-used since the TCSs are defined based on the same binary codes in the I/Q-plane. However, since it is only modulation schemes used in EGPRS and EGPRS2-A that use the same number of TSCs as GMSK modulation, the VAMOS TSCs may only be re-used for EGPRS and EGPRS2-A. For EGPRS2-B new at least substantially orthogonal TSCs will have to be defined. Alternatively, new sets of training sequences may be defined for all modulations different from GMSK, in order to achieve better orthogonality among training sequences. One difference between the EGPRS2-A and EGPRS2-B is that EGPRS2-B has a different symbol rate than EGPRS2-A so that the training sequences of EGPRS2-B are longer. The transmitter 201 comprises two parallel, independent, transmitter chains. The two modulators are fed the same payload, but different training sequences are used in each transmitter chain. The training sequences are at least substantially orthogonal. The two modulated signals are independently up-mixed, amplified and simultaneously transmitted through two different Tx antennas 207, as shown in FIG. 4 for circuit switched services or GPRS (GMSK modulated), or in FIG. 5 for packet switched services. FIG. 4 illustrates the transmitter configuration 1 for CS or GPRS comprising a diversity transmitter without beamforming and using two at least substantially orthogonal antenna specific training sequences. As seen in FIG. 4, the diversity transmitter 201 without beamforming for CS comprises a first GMSK modulator 401a and a second GMSK modulator 401b. The same user code bits are fed to both the first GMSK modulator 401a and the second GMSK modulator 401b. A first set of VAMOS training sequence is used in the first GMSK modulator 401a and a second set of paired VAMOS training sequence is used in the second GMSK modulator 401b. The VAMOS training sequences are divided into two sets, set 1 and set 2, with 8 training sequences each. The training sequences are to be used in pairs. For example TSC 3 of set 1 is used with TSC 3 of set 2. So they build "pairs". A pair is assured to be substantially orthogonal, by design. The output of the first GMSK modulator 401a is a baseband signal which is transmitted out through the first Tx antenna 207a. The output of the second GMSK modulator 401b is a baseband signal which is transmitted out through the second Tx antenna 207b. FIG. 5 shows the transmission configuration 1 for PS with a diversity transmitter without beamforming and using two at least substantially orthogonal antenna specific training sequences. As seen in FIG. 5, the diversity transmitter 201 without beamforming for PS comprises a first EGPRS modulator 501a and a second EGPRS modulator 501b. The same user code bits are fed to both the first EGPRS modulator 501a and the second EGPRS modulator 501b. A first set of training sequence for the first EGPRS modulator 501a coupled to the first Tx antenna 207a is used in the first EGPRS modulator 501a. The training sequence for the first EGPRS Modulator 501a may be for example chosen from a first set of VAMOS training sequences. A second set of training sequence for the second EGPRS modulator 501b coupled to the second Tx antenna 207b is used in the second EGPRS modulator 501b. The second set of training sequence may be at least substantially orthogonal to the first set of training sequence, i.e. to each training sequence in one set, there is one corresponding at least substantially orthogonal training sequence in the second set. The second set of training sequence may be for example a paired second set of VAMOS training sequence. The output of the first EGPRS modulator 501a is a baseband signal which is transmitted out through the first Tx antenna 207a. The output of the second EGPRS modulator 501b is a baseband signal which is transmitted out through the second Tx antenna 207b.

Figure 6:
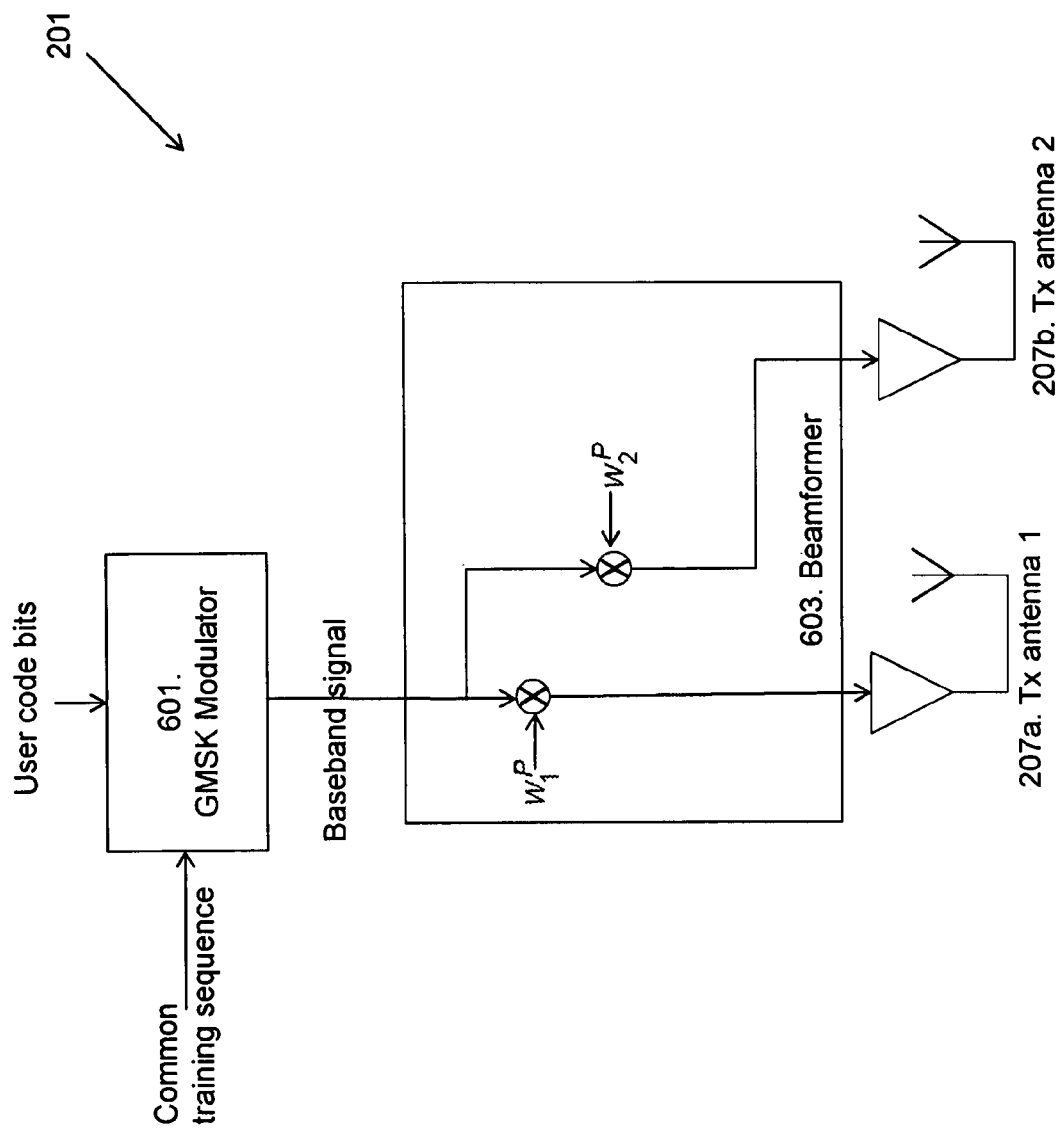
FIG. 6 is a schematic block diagram illustrating embodiments of a Tx configuration 2 for CS or GPRS, beamforming transmitter and one training sequence used.
Figure 7:
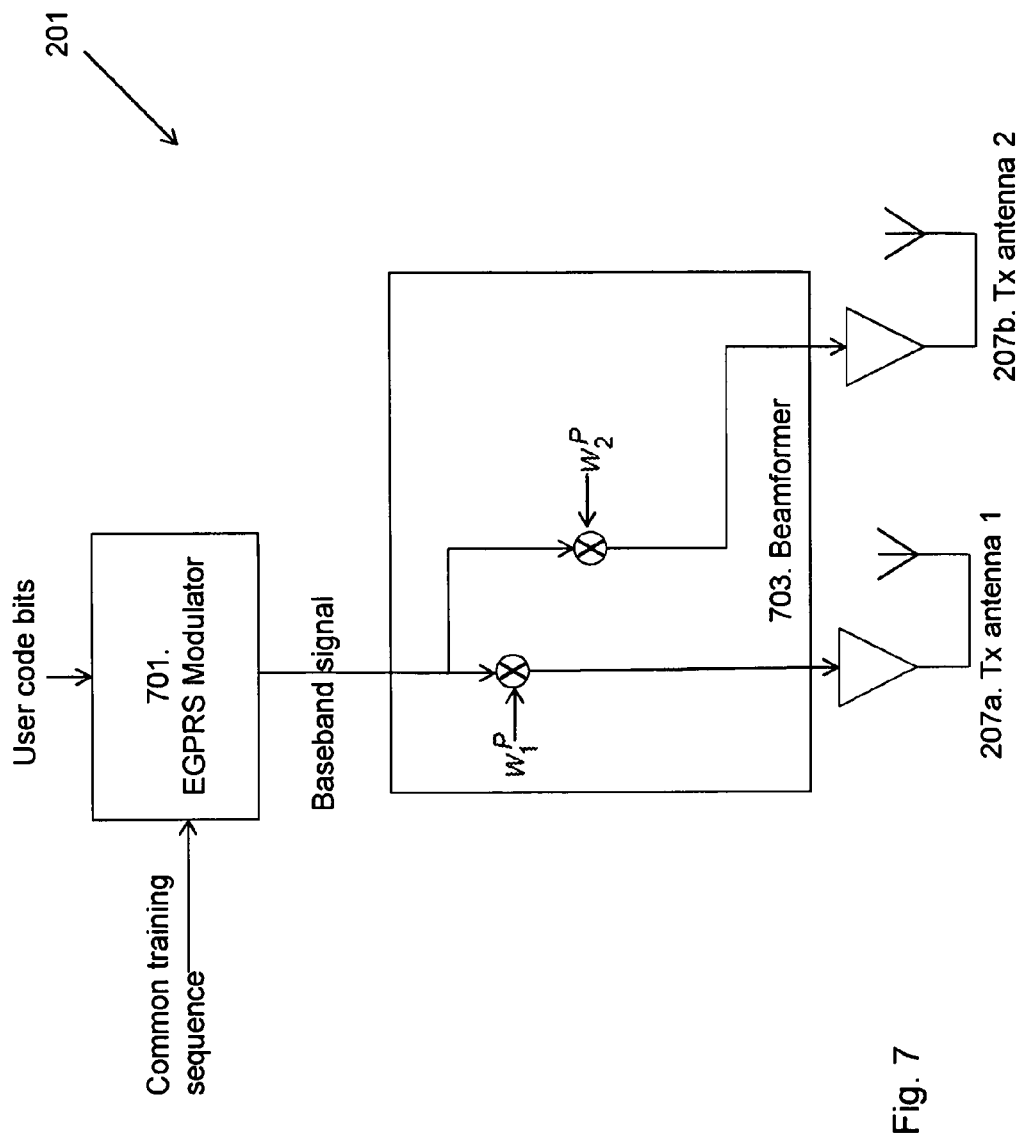
FIG. 7 is a schematic block diagram illustrating embodiments of a Tx configuration 2 for PS, beamforming transmitter and one training sequence used.

Transmitter configuration 2. Some data bursts are transmitted using beamforming. In this case only one modulator and one training sequence are used. The modulated signal is fed to a beamforming network, with beamforming weights chosen among beamformers in a codebook, and the resulting signals are up-mixed, amplified and transmitted through the different transmit antennas 207. This transmitter 201 configuration is illustrated in FIG. 6 for circuit switched services or GPRS (GMSK modulated), and in FIG. 7 for packet switched services. In these figures the beamformers $W^p$ belong to a finite, predefined codebook of beamformers $(W^p)_{p=1}^P$. Each beamformer is a vector of complex numbers that indicate how to change the amplitude and phase of the signals. In FIG. 6, illustrating the beamforming transmitter 201 for the transmitter configuration 2 for CS or GPRS uses only one common training sequence. The transmitter 201 in FIG. 6 comprises a GMSK modulator 601 with user code bits as input. A first set of common VAMOS training sequence is used at the GMSK modulator 601 in order to output a baseband signal to a beamformer 603. After beamforming, the beamformed signal is transmitted through the first Tx antenna 207a and the second Tx antenna 207b. In FIG. 7, illustrating the beamforming transmitter 201 for the transmitter configuration 2 for PS using only one common training sequence. The transmitter 201 in FIG. 7 comprises an EGPRS modulator 701 with user code bits as input. A common training sequence is used at the EDGE modulator 701 in order to output a baseband signal to a beamformer 703. The common training sequence may be a standardized training sequence. After beamforming, the beamformed signal is transmitted through the first Tx antenna 207a and the second Tx antenna 207b. For both FIGS. 6 and 7, the signal transmitted through the first Tx antenna 207a is associated with the beamformer $W_1^P$ and the signal transmitted through the second Tx antenna is associated with the beamformer $W_2^P$.

The transmitter 201 will alternate between the transmitter configurations 1 and 2 defined above. In other words, the transmitter 201 alternates between beamformed and non-beamformed transmissions. Alternate means in this context that the beamformed and non-beamformed transmissions are interchanged. The beamformed and the non-beamformed transmission may be transmitted every second transmission, however any other transmission scheme may also be used, such as for example, two beamformed transmissions, then one non-beamformed transmission, then three beamformed transmissions etc., as understood by the skilled person. Beamformed transmissions are desired in order to increase the Signal to Noise Ratio (SNR) of the received signal. However, non-beamformed transmissions are necessary to allow the receiver 205 to estimate the preferred beamformer in the codebook. There are many possible ways to alternate between beamformed and non-beamformed transmissions. For example, one simple way to schedule the transmissions is to choose a positive integer K, for example K=8 or K=16, and transmit non-beamformed data bursts every K-th TDMA frames. The transmitter 201 (i.e. the network in case of DL transmission) may dynamically change K during the duration of a call or data transmission. For example, small values of K may be more appropriate when the radio channel varies rapidly. The dynamical nature of K poses no problem at the receiver side since the number of training sequences (1 or 2) is used to blindly detect whether the transmitter used beamforming. Alternatively, the value of K may be signaled to the receiver 205 or configured at call setup.

Figure 8:
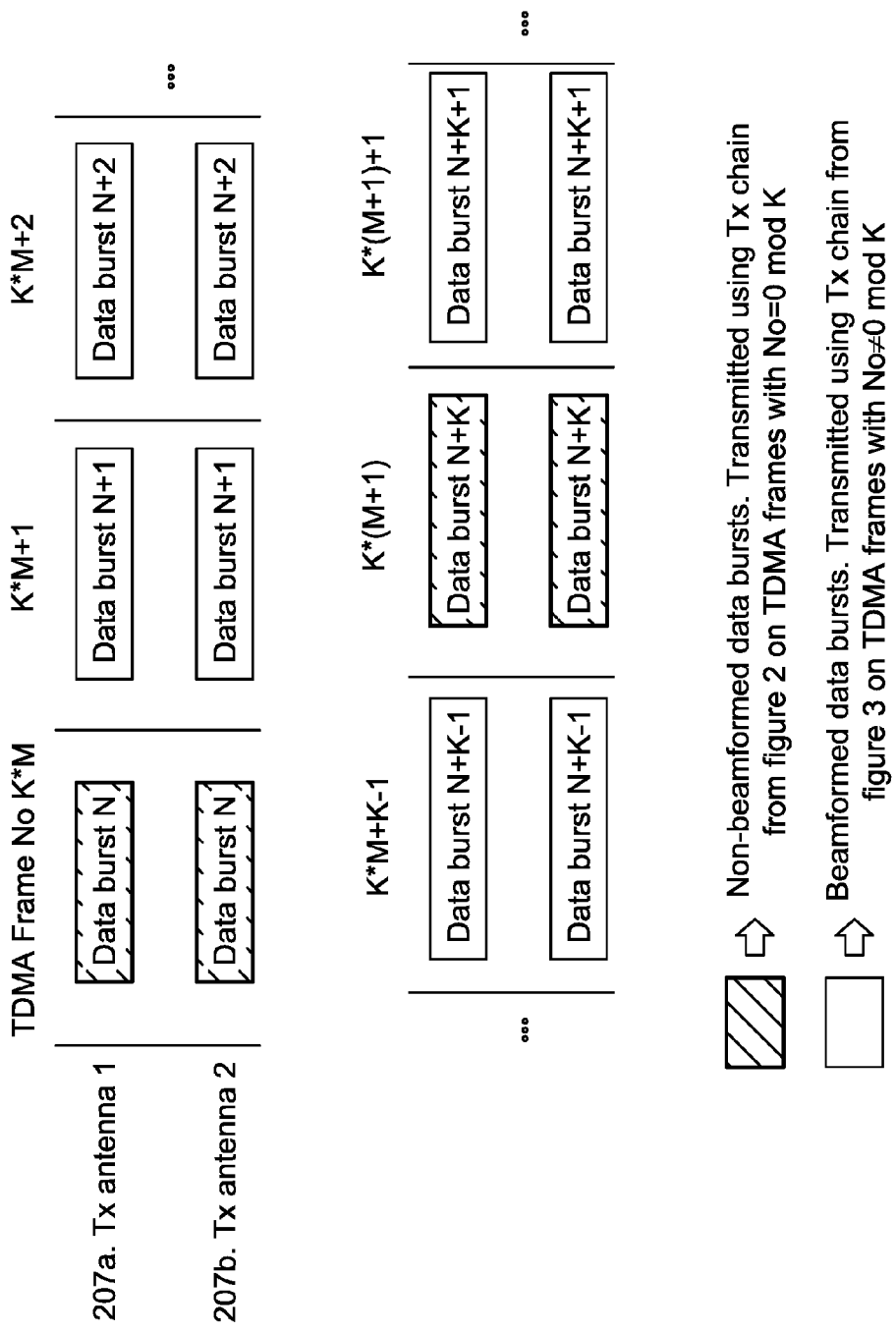
FIG. 8 is a schematic diagram illustrating embodiments of scheduling of beamformed and non-beamformed transmissions. The periodicity parameter K may be dynamically adjusted by the transmitter (i.e. the network for DL transmission).

In addition to K, a common reference in the TDMA frame structure needs to be described in the specifications for the user equipment and the base station. This process is illustrated pictorially in FIG. 8 and by means of a flow diagram in FIG. 9. FIG. 8 illustrates an embodiment of scheduling of beamformed/non-beamformed transmissions where the periodicity parameter K may be dynamically adjusted by the transmitter 201 (i.e. the network for DL transmission). The upper row illustrates the first Tx antenna 207a and the bottom row illustrates the second Tx antenna 207b. Each section illustrates a TDMA Frame, where the left most TDMA Frame is number K*M and the right most TDMA Frame is number K*(M+1)+1. The shaded boxes represent non-beamformed data bursts. The non-beamformed data bursts, are transmitted using the Tx chain from FIG. 4 on TDMA frames with NO=0 mod K. The white boxes represent beamformed bursts. The beamformed bursts are transmitted using the Tx chain from FIG. 5 on TDMA frames with No≠0 mod K. mod is short for modulo or modulus and is an operation which finds the remainder of division of one number by another.

Figure 9:
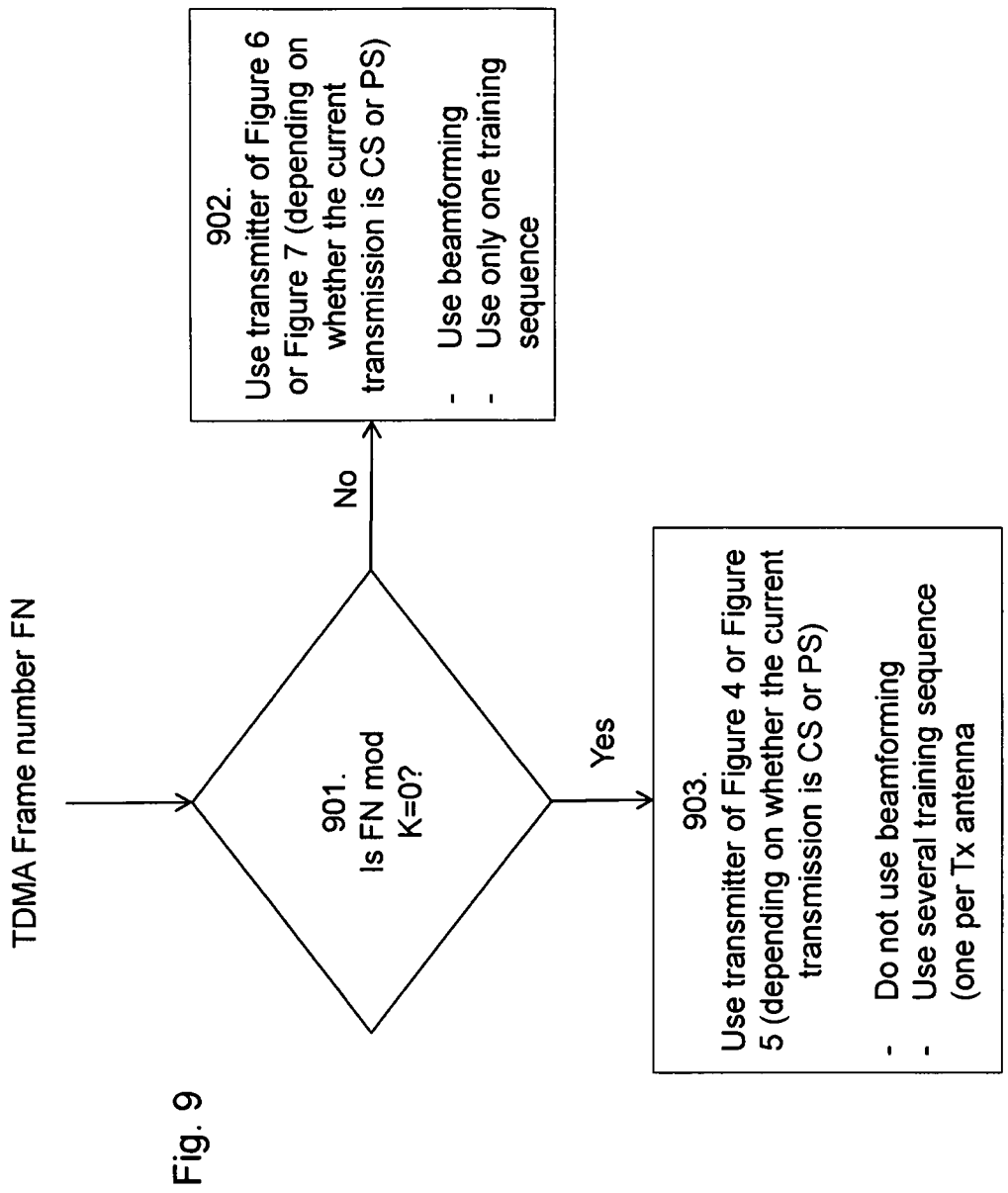
FIG. 9 is a flow chart illustrating embodiments of a method for scheduling of beamformed and non-beamformed transmissions.

FIG. 9, describing scheduling of beamformed/non-beamformed transmissions comprises the following steps to be performed by the receiver 205, which steps may be performed in any suitable order:

Step 901

The input to step 901 is the TDMA Frame Number (FN). The receiver 205 checks whether FN mod K=0, where FN is the TDMA FN. When FN mod K=0 the method proceeds to step 902. When FN mod K≠0 the method proceeds to step 903.

Step 902

This step is performed when FN mod K=0, indicated with "no" in FIG. 9, and is an alternative to step 903. It is determined to use the transmitter 201 of FIG. 6 or FIG. 7, depending on whether the current transmission is CS or PS. Beamforming is used together with only one common training sequence.

Step 903

This step is performed when FN mod K≠0, indicated with "yes" in FIG. 9, and is an alternative to step 902. The transmitter 201 of FIG. 4 or FIG. 5 is used, depending on whether the current transmission is CS or PS. Several training sequences are used (one training sequence per Tx antenna 207) when beamforming is not used.

Beamforming Detection

The transmitter 201 needs to indicate to the receiver 205 whether or not beamforming is used. In the current section some alternatives for signaling the use of beamforming/non-beamforming are outlined:

Explicit Signaling in System Information (SI)

An information element may be added to system information transmitted in each cell on the Broadcast Control CHannel (BCCH). The information element would then contain K, described above. K could be changed over time, and will apply for all user equipments in the cell capable of receiving beamformed transmissions.

Dedicated Signaling

In order to apply different frequency of occurrence (K) of the non-beamformed data burst to different user equipments, dedicated signaling may be utilized, where an information element in a signaling message is used to convey K. Alternatively the signaling message may be used to switch between non-beamformed and beamformed transmission. Current dedicated signaling procedures for CS comprise using modified Slow Associated Control CHannel (SACCH) and Fast Associated Control CHannel (FACCH) messages when signaled during a call. For PS, K may typically be signaled on Packet Associated Control CHannel (PACCH,) or with the use of a modified PAN, or on the Packet Timing Advance Control CHannel/Downlink (PTCCH/D) channel. The K-value may also be signaled to the user equipment during call setup. PAN is short for Piggybacked Acknowledgement/Not acknowledgement. Dedicated signaling may be described as signaling which is devoted to a particular purpose or cause.

Dedicated in-Band Signaling

Figure 10:
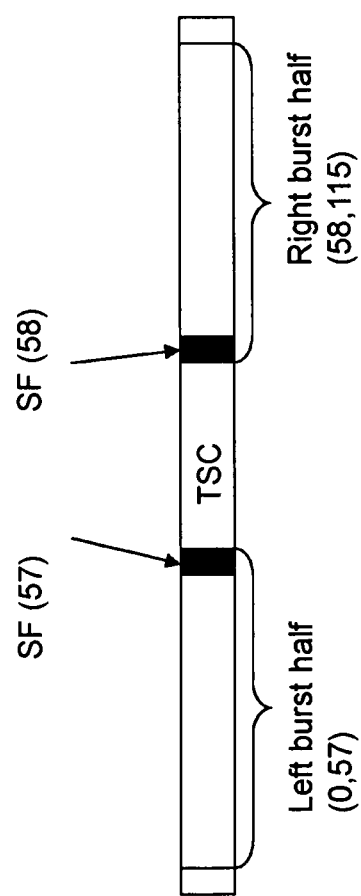
FIG. 10 is a schematic block diagram illustrating embodiments of stealing flag data burst mapping for Gaussian Minimum-Shift Keying (GMSK) data bursts.

To minimize signaling overhead, the information could be conveyed by re-defining the header fields in the current header definitions in 3GPP for PS. For CS, Stealing Flags (SF) for speech may be used to allow for in-band signaling in the speech frames. The signaling is in-band when the data and control signals are transmitted within the same channel or frequency. This is in contrast to out-band signaling which is when control signals reside in a channel separate from the data. Currently, the stealing flags are bits mapped onto each data burst in bit position 57 and 58, see FIG. 10. The state in the stealing flags depends on whether the transmitted frame comprises speech or dedicated signaling. Table 2 shows the current definition of the stealing flags. The left column of table 2 comprises the frame and the right column comprises the stealing flags.

TABLE 2

Current use of stealing flags for speech services in GSM

| Frame | Stealing flags |
|---|---|
| Speech frame (TCH/FS, TCH/EFS, TCH/HS, TCH/AFS, TCH/AHS) | 00000000 |
| SID related frames (SID_UPDATE, SID_FIRST, ONSET) | 00000000 |
| Dedicated signaling (FACCH/F, FACCH/H) | 11111111 |

In table 2, TCH/FS is short for Traffic CHannel/Full rate Speech, TCH/EFS is short for Traffic CHannel/Enhanced Full rate Speech, TCH/HS is short for Traffic CHannel/Half rate Speech, TCH/AFS is short for Traffic CHannel/Adaptive multirate Full Speech and TCH/AHS is short for Traffic CHannel/Adaptive multirate Half Speech. SID is short for Silence Insertion Descriptor. In table 2, SID_UPDATE indicates comfort noise, SID_FIRST marks the end of a talkspurt and the beginning of a speech pause, and ONSET is a parameter which announces the beginning of a speech data burst. The F in FACCH/F is short for full rate and the H in FACCH/H is short for half rate.

To convey whether or not beamforming is used, two additional states may be defined. The stealing flags for the two new states should be chosen to maximize the Hamming distance. An example is shown in Table 3.

TABLE 3

Use of stealing flags for speech services in GSM using beamforming

| Frame | Stealing flags |
|---|---|
| Speech/SID frame, non-beamformed (as today) | 00000000 |
| Speech frame, beamformed | 01010101 |
| Dedicated signaling, beamformed | 10101010 |
| Dedicated signaling, non-beamformed (as today) | 11111111 |

The stealing flag 00000000 may be referred to as a first SF, the stealing flag 01010101 may be referred to as a second SF, the stealing flag 10101010 may be referred to as a third SF and the stealing flag 11111111 may be referred to as a fourth SF.

Due to the diagonal interleaving of speech, only one stealing flag/data burst will be inserted, while the other stealing flag of the data burst will come from the previous or following frame. Thus, to ensure robustness of the signaling it is recommended that the signaling of beamforming is done on a frame basis instead of data burst basis.

Implicit Signaling by Using a Different TSC in Each Transmitted Signal

In GSM/EGPRS today there are two sets of training sequence codes, each comprising eight TSC's. The second set is defined for circuit switched services by the VAMOS feature. The paired training sequences from the second set are at least substantially orthogonal to the training sequences of the first set. Non-beamformed transmissions require the use of different, at least substantially orthogonal training sequences in each of the Tx branches, as shown in FIG. 4. Thus, the receiver 205 may use the fact that beamformed signals contain only one common training sequence while non-beamformed signals contain two antenna specific training sequences in order to blindly detect whether the transmitter 201 has used beamforming.

Receiver

In some embodiments the receiver 205 detects the number of training sequences used by the transmitter 201. When two different antenna specific training sequences are detected, then the receiver 205 determines that beamforming has not been used.

In this case, the receiver 205 may also estimate the preferred (instantaneous) beamformer from the codebook. This is the beamformer that if it had been used (hypothetically), it would have resulted in the best signal quality for the current data burst. The signal quality may be measured in terms of the SNR, bit error rate or other quality statistic. The determination of the preferred beamformer from the codebook could be accomplished as follows. Assuming that the receiver 205 has one Rx antenna 210 since this is the most common case, although the algorithms will have even better performance when there is more than one Rx antenna 210. The received signal over the training sequence (after derotation) may be described by a linear 2×1 Multiple Input Single Output (MISO) model of the following form:

$$Y = S \cdot H + T \cdot G + E \quad (1)$$

where $$Y = \begin{bmatrix} y(n_0 + L) \\ \vdots \\ y(n_0 + N) \end{bmatrix}$$

is the vector of received samples, $$S = \begin{bmatrix} s(L) & \cdots & s(1) \\ \vdots & \ddots & \vdots \\ s(N) & \cdots & s(N-L+1) \end{bmatrix} \text{ and} \quad (2)$$

$$T = \begin{bmatrix} t(L) & \cdots & t(1) \\ \vdots & \ddots & \vdots \\ t(N) & \cdots & t(N-L) \end{bmatrix}$$

are the regression matrices consisting of known training symbols $(s(n))_{n=1}^{N}$, $(t(n))_{n=1}^{N}$ used in the signals transmitted through the first Tx antenna 207a and the second Tx antenna 207b respectively, $$H = \begin{bmatrix} h(1) \\ \vdots \\ h(L) \end{bmatrix} \text{ and } G = \begin{bmatrix} g(1) \\ \vdots \\ g(L) \end{bmatrix}$$

are the L-tap channels from each Tx antenna 207 to the receiver 205, $$E = \begin{bmatrix} e(n_0 + L) \\ e(n_0 + N) \end{bmatrix}$$

is a noise plus interference matrix, $n_0$ is the synchronization position and N is the total number of training symbols. A typical value of L in GSM/EGPRS is L=5 and there are N=26 training bits.

The training sequences for the two transmitted signals should be designed with good orthogonality properties, so that $$S^H T \approx 0_{L \times L}, \quad (3)$$

where $0_{L \times L}$ denotes the matrix of zeros of dimension L×L. Therefore, when the transmission has not been beamformed, the receiver 205 may estimate the 2 vector channels H from the first Tx antenna 207a and G from the second Tx antenna 207b. For example, using a least squares estimate, and using (3), the following estimates $\hat{H}$ and $\hat{G}$ of the two channels are obtained.

$$\hat{H} = (S^H S)^{-1} S^H Y \approx H + (S^H S)^{-1} S^H E = H + E', \quad (4)$$

$$\hat{G} = (T^H T)^{-1} T^H Y \approx G + (T^H T)^{-1} T^H E = G + E''. \quad (5)$$

When the SNR is high enough then the noise components E',E'' are small and the estimation is accurate.

Given the channel estimates $\hat{H}$ and $\hat{G}$, obtained for example by equations (4) and (5), it is well known in the art how to estimate the beamformer matrix $W^p$ belonging to the codebook that would have resulted in the highest signal quality for the current data burst. For example, using the estimates from equations (4) and (5) the preferred beamformer $W^p$ may be chosen to be the beamformer that maximizes the received signal power as follows:

$$\hat{p} = \underset{p}{\operatorname{argmax}} \left\| \tilde{S}_p \cdot \hat{H} + \tilde{T}_p \cdot \hat{G} \right\|_2^2, \quad (6)$$

where $\| \ \|_2$ denotes the second norm of a vector, $\tilde{S}_p = W_1^p \cdot S$ and $\tilde{T}_p = W_2^p \cdot T$.

Hence, when the data burst is not beamformed, the orthogonality of the training sequences, given by (3), allows the receiver 205 to produce an estimate $\hat{p}$ of the index p in the beamformer codebook that would have given the best signal quality to the current data burst.

Figure 11:
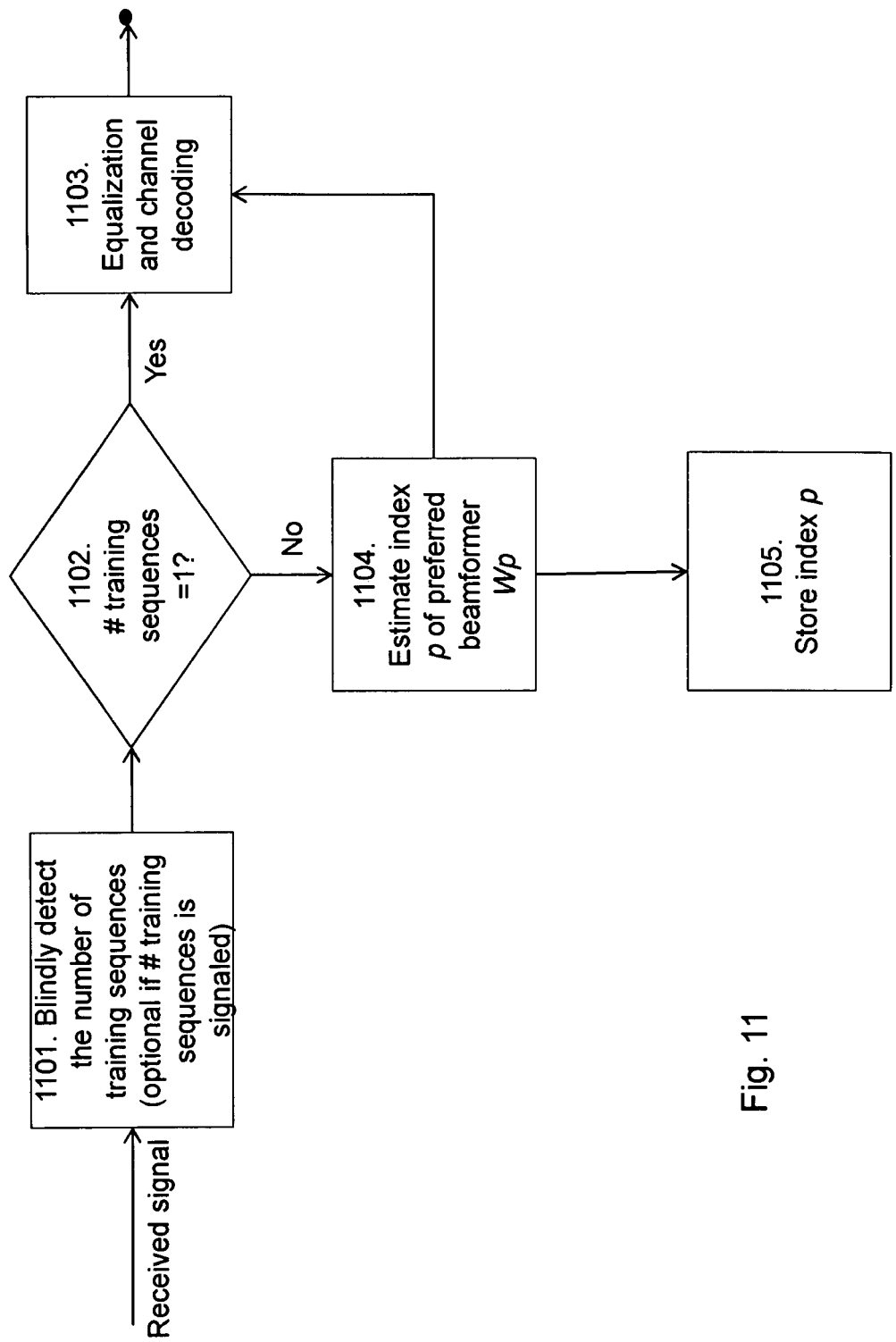
FIG. 11 is a flow chart illustrating embodiments of a method in a receiver where the occurrence of beamforming is blindly detected at the receiver.

An embodiment of a method for receiver processing is depicted in the flow diagram in FIG. 11. Observe that the estimated index of the beamformer in the codebook is stored in a memory 1810 for further processing and reporting. The memory 1810 will be described in more detail with reference to FIG. 18 below. The method comprises the following steps, which steps may be performed in any suitable order:

Step 1101

The receiver 205 blindly detects the number of training sequences in the received signal, i.e. the received data burst. This step is an optional step and it is not performed when the use of beamforming for each burst has been signaled to the receiver, e.g. when the number of training sequences is signaled to the receiver 205.

Step 1102

The receiver 205 checks whether the number of training sequences=1. When the number is equal to one, the method proceeds to step 1103. When the number is different from one, the method proceeds to step 1104.

Step 1103

When the number of training sequences is one, indicated with "yes" in FIG. 11, this step 1103 is performed. The receiver 205 performs equalization and channel decoding.

Step 1104

When the number of training sequences is different from one, indicated with "no" in FIG. 11, this step 1104 is performed. The receiver 205 estimates the index p in the codebook of the preferred beamformer $W^p$. After this, the method proceeds to step 1103 to perform equalization and channel decoding.

Step 1105

This step is performed after step 1104 and at the same time as step 1103, before step 1103 or after step 1103. The receiver 205 stores the estimated index p.

Figure 12:
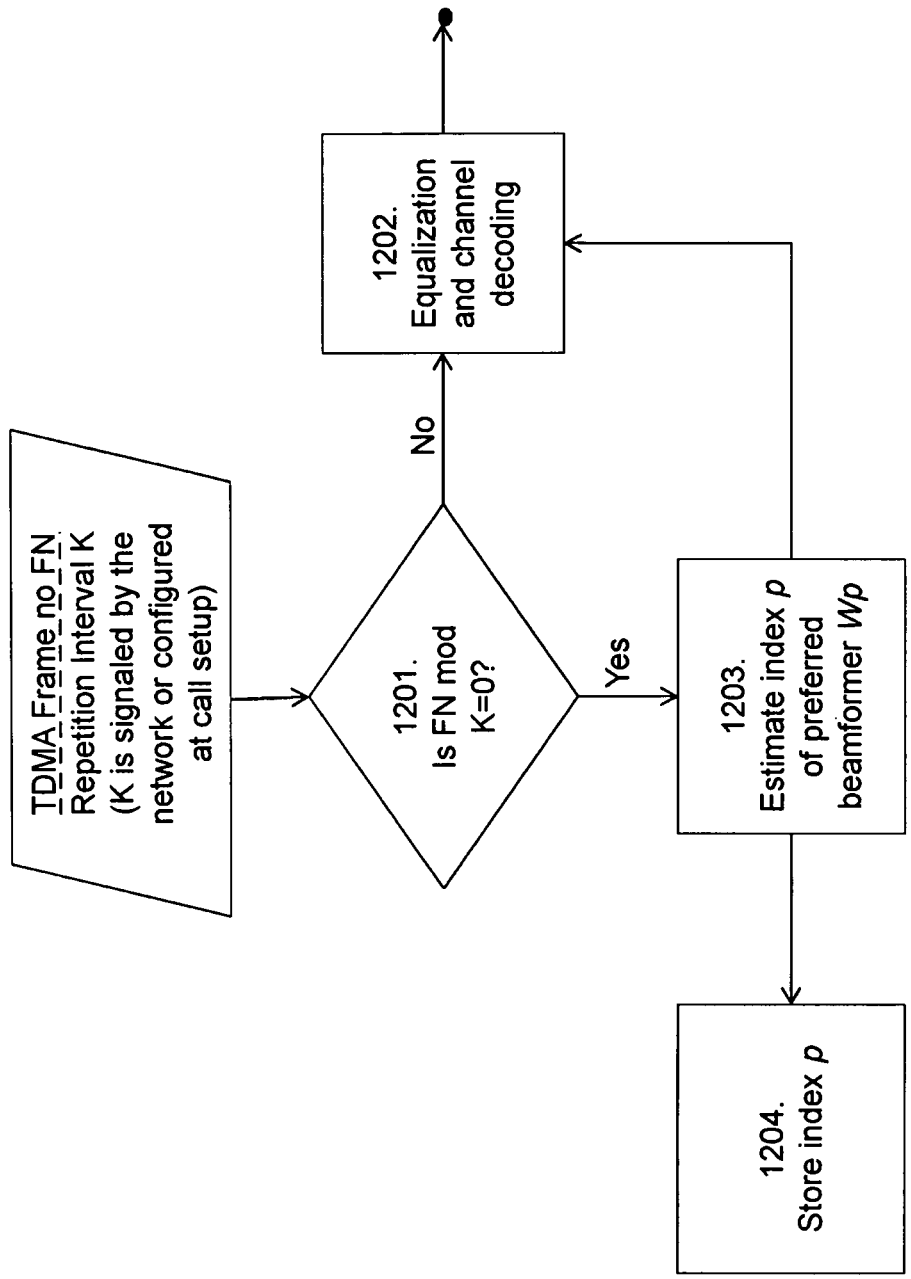
FIG. 12 is a flow chart illustrating embodiments of a method in a receiver where the occurrence of beamforming is signaled to the receiver.

When it is known at the receiver 205 whether beamforming is used (e.g. by signaling or handshaking), then the blind detection of beamforming need not be performed. For example the receiver 205 may know the value of the parameter K that controls the periodicity of the non-beamformed transmissions. In this case the receiver processing is as depicted in the flow diagram in FIG. 12. Observe that the estimated index of the beamformer in the codebook is stored in memory 1810 for further processing and reporting. FIG. 12 comprises the following steps, which steps may be performed in any suitable order:

Step 1201

The receiver 205 checks whether FN mod K=0 or not. FN is short for Frame Number and is a TDMA frame number. K is a repetition interval signaled by the network or configured at call setup. When FN mod K=0, the method proceeds to step 1202. When FN mod K≠0, the method proceeds to step 1203.

Step 1202

The receiver 205 performs equalization and decoding when FN mod K=0, indicated with "no" in FIG. 12.

Step 1203

When FN mod K is zero, indicated with "yes" in FIG. 12, the receiver 205 estimates index p of the preferred precoding matrix $W^p$. The method proceeds to step 1202 and to step 1204.

Step 1204

The receiver 205 stores the index p in the memory 1810. Step 1204 is performed when the receiver 205 has estimated the index p, and it may be directly after step 1203, after step 1202, after step 1203 and before step 1202, or at the same time as step 1202.

Figure 13:
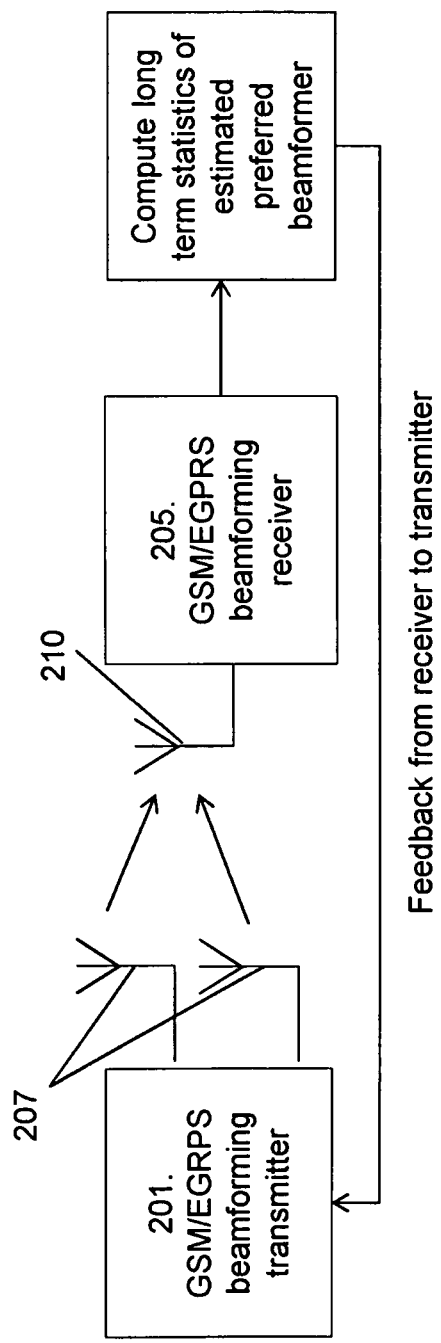
FIG. 13 is a schematic block diagram illustrating embodiments of a receiver that feeds back long term statistics of the beamformer estimates to the transmitter.

The beamformer estimates are performed for each non-beamformed data burst. These estimates are analyzed by the receiver 205 and long term statistics are computed and fed back to the transmitter 201. Long term statistics refer to statistics calculated over time periods much greater than the coherence time of the channel. In practice, these time periods may be of the order of 0.5 sec. or 1 sec. This feedback mechanism is shown in FIG. 13.

Closed Loop Antenna Diversity

Figure 14:
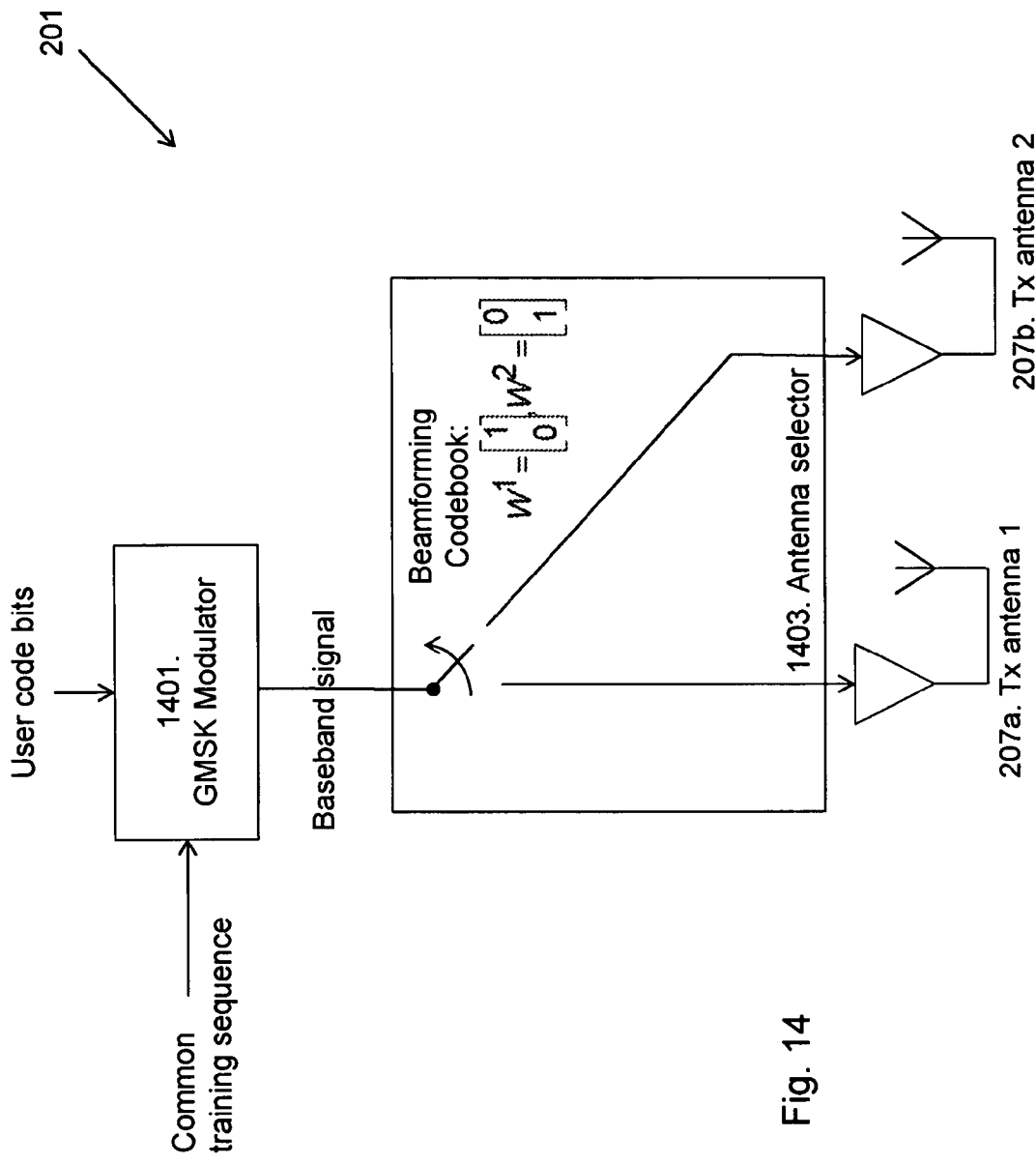
FIG. 14 is a schematic block diagram illustrating embodiments of antenna selection as a particular instance of beamforming.

Some legacy GSM/EGPRS base stations are capable of transmit diversity, but may not be capable of supporting the general beamforming network shown in FIG. 6. By choosing a beamformer codebook with two beamformers $\{W^1, W^2\}$ given by $W_1^1=1, W_2^1=0$ and $W_2^1=0, W_2^2=1$, a closed loop antenna selection system is obtained. In this case the transmitter 201 takes the form shown in FIG. 14. It might be possible to use it in legacy base stations that cannot support the full-fledged beamforming depicted in FIG. 6. In FIG. 14, the transmitter 201 comprises a GMSK modulator 1401 with user code bits as input. One common training sequence, e.g. a VAMOS training sequence is used. The transmitter 201 comprises an antenna selector 1403 as a particular instance of beamforming. The beamforming codebook $$W^1 = \begin{bmatrix} 1 \\ 0 \end{bmatrix}, W^2 = \begin{bmatrix} 0 \\ 1 \end{bmatrix}$$

yields the antenna selection, i.e. selecting that the transmission should go through either the first Tx antenna 207a or through the second Tx antenna 207b.

Capability Signalling

In order for the network to know that the user equipment supports the beamforming feature, and in particular the closed loop beamforming transmission schemes, it needs to be indicated to the network in the Radio Access Capability IE from the user equipment.

Figure 15:
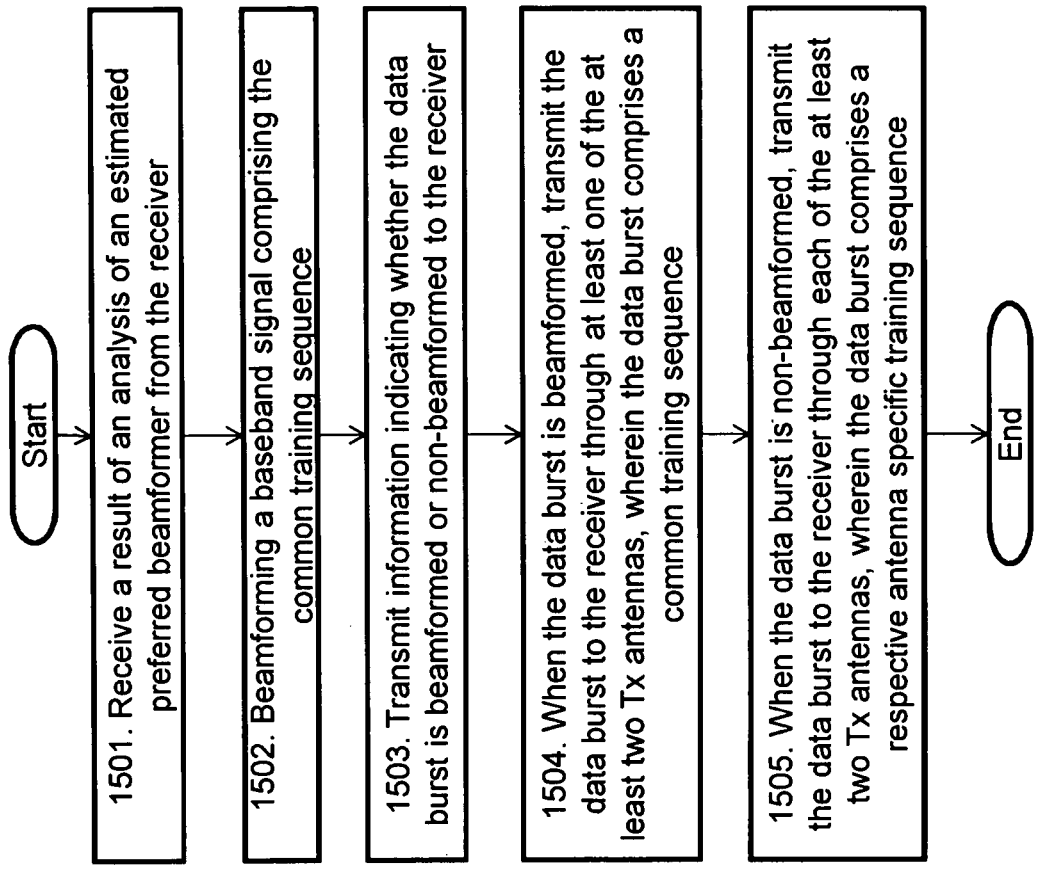
FIG. 15 is a flow chart illustrating embodiments of a method in a transmitter.

The method described above will now be described seen from the perspective of the transmitter 201. FIG. 15 is a flowchart describing the present method in the transmitter 201 for transmitting a data burst to a receiver 205 in the system 200 supporting GSM and/or EGPRS. The transmitter 201 is arranged to make its transmissions with or without beamforming. The transmitter 201 comprises at least two Tx antennas 207. In some embodiments, the transmitter 201 is represented by a base station and the receiver 205 is represented by a user equipment, or the transmitter 201 is represented by a user equipment and the receiver 205 is represented by a base station. The method comprises the following steps, which steps are performed in any suitable order than described below:

Step 1501

In some embodiments, the transmitter 201 receives a result of an analysis of an estimated preferred beamformer from the receiver 205. The estimated preferred beamformer is estimated by the receiver 205. The received result comprises an estimated preferred beamformer index in a codebook.

Step 1502

Figure 3:
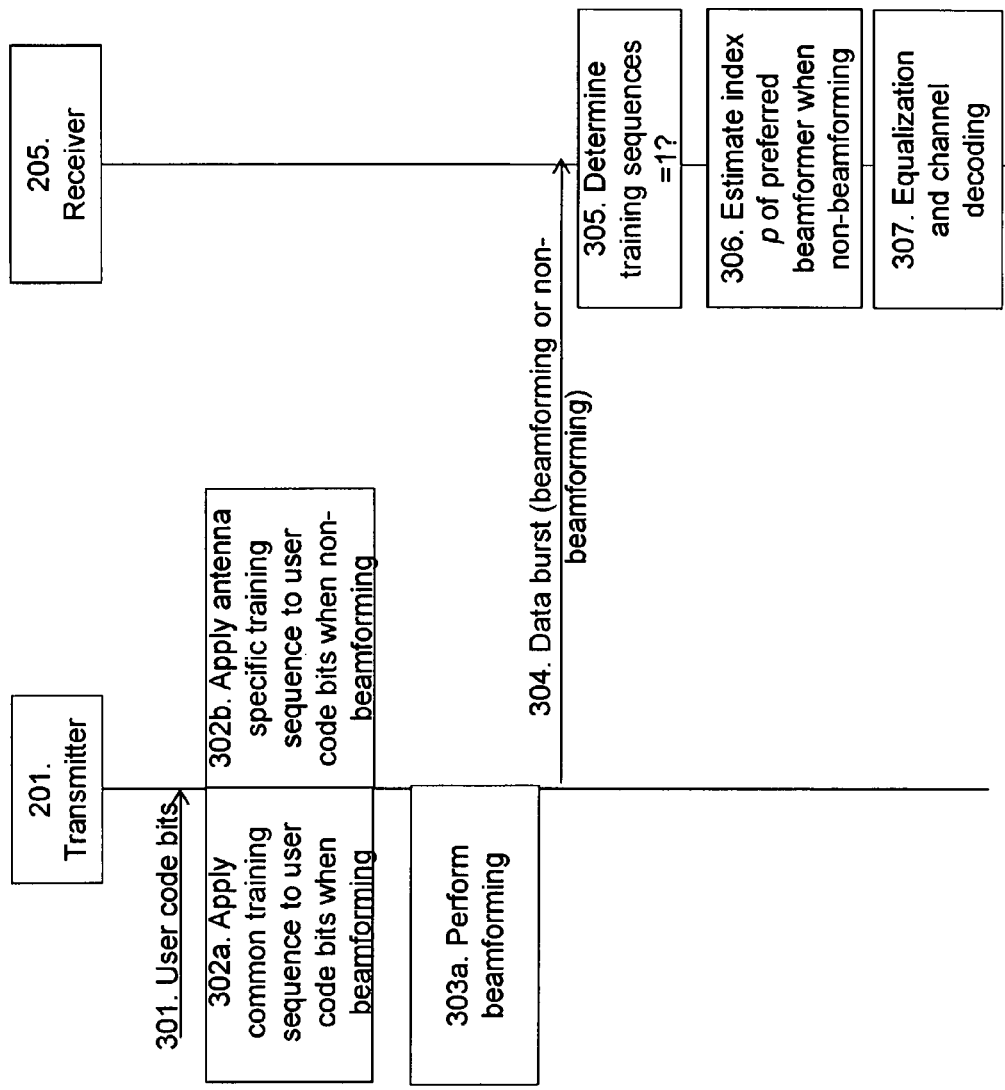
FIG. 3 is a signaling diagram illustrating embodiments of a method.

This step corresponds to step 303a in FIG. 3. In some embodiments, the transmitter 201 beamforms a baseband signal comprising the common training sequence. The beamforming is based on applying a beamforming weight chosen from a plurality of beamforming weights in a codebook or based on closed loop antenna selection. This step is not performed when the data bust is non-beamformed.

In some embodiments, the beamforming of the baseband signal is further based on the results received in step 1501 when coming future transmissions of data burst should be beamformed.

Step 1503

This step corresponds to step 304 in FIG. 3. In some embodiments, the transmitter 201 transmits information indicating whether the data burst is beamformed or non-beamformed to the receiver 205. The information indicating whether the data burst is beamformed or non-beamformed is transmitted in an information element and/or using dedicated signalling and/or using dedicated in-band signalling and/or using implicit signalling.

Stealing flags may be used when transmitting the information using the dedicated in-band signalling and when the data burst is circuit switched. A first SF is used for indicating non-beamforming when the data burst comprises speech, a second SF is used for indicating beamforming when the data burst comprises speech, a third SF is used for indicating beamforming when the data burst comprises dedicated signalling and a fourth SF is used for indicating non-beamforming when the data burst comprises dedicated signalling. This is seen in more detail in table 3.

Step 1504

This step corresponds to step 304 in FIG. 3. When the data burst is beamformed, the transmitter 201 transmits the data burst to the receiver 205 through at least one of the at least two Tx antennas 207. The data burst comprises a common training sequence. The common training sequence may be the same for all of the at least two Tx antennas 207 when the data burst is beamformed. The data burst may further comprise user modulating code bits and tail bits.

Step 1505

This step corresponds to step 304 in FIG. 3. When the data burst is non-beamformed, the transmitter 201 transmits the data burst to the receiver 205 through each of the at least two Tx antennas 207. The data burst comprises a respective antenna specific training sequence. The antenna specific training sequences for each of the at least two TX antennas 207 may be different from each other when the data burst is non-beamformed. The antenna specific training sequences may be at least substantially orthogonal antenna specific training sequences. The data burst may further comprise user modulating code bits and tail bits.

In some embodiments, the beamformed data burst and non-beamformed data burst are alternately transmitted to the receiver 205. In some embodiments, the beamformed data burst and the non-beamformed data burst are alternated by transmitting the non-beamformed data bursts every K-th TDMA frames. K is a positive integer, and K is constant or dynamically changed by transmitter 201. K may be transmitted in step 1503.

Figure 16:
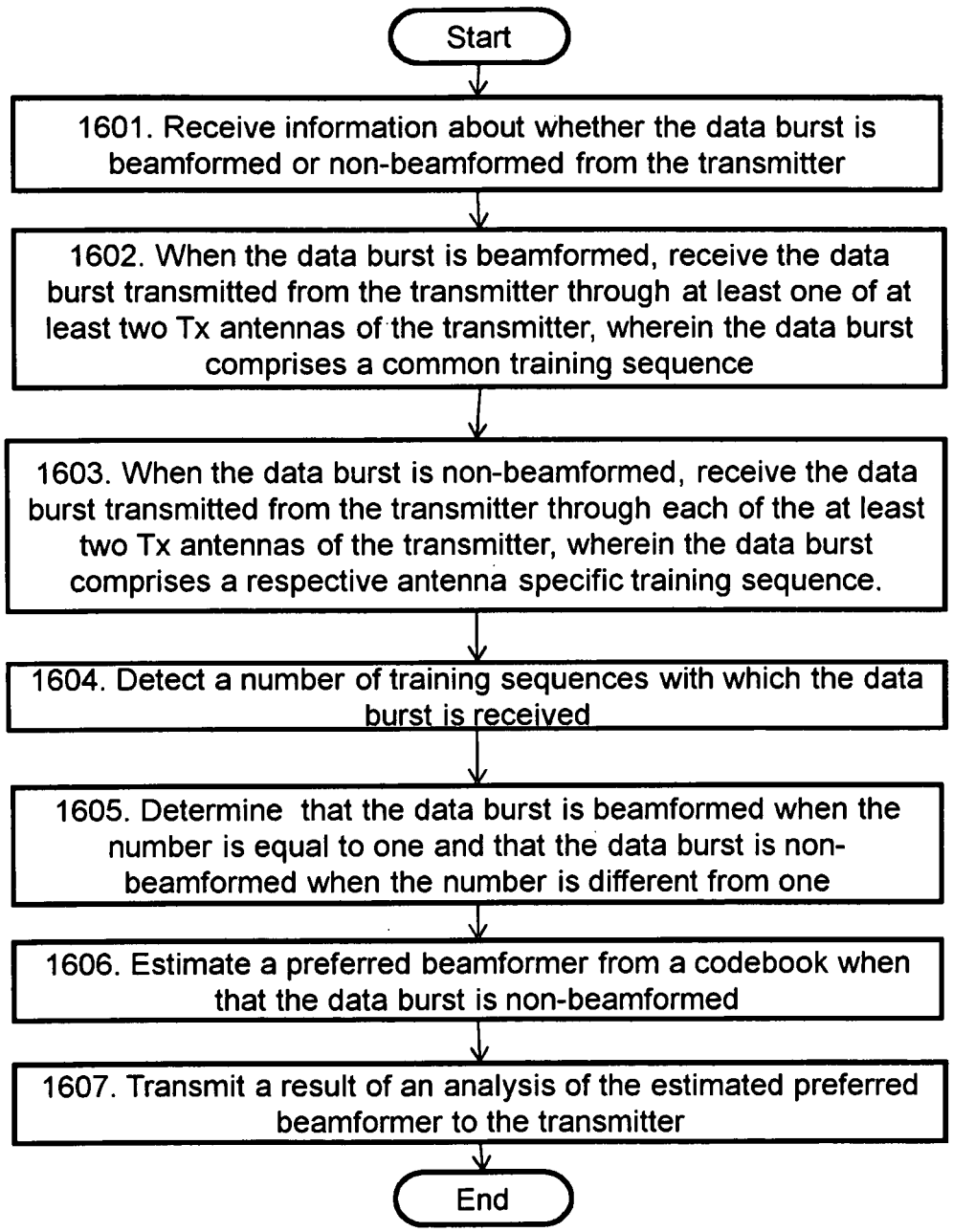
FIG. 16 is a flow chart illustrating embodiments of a method in a receiver.

The method described above will now be described from the perspective of the receiver 205. FIG. 16 is a flowchart describing the present method in the receiver 205 for receiving a data burst from a transmitter 201 in a system 200 supporting GSM and/or EGPRS. The receiver 205 comprises at least one Rx antenna 210. In some embodiments, the transmitter 201 is represented by a base station and the receiver 205 is represented by a user equipment. In other embodiments, the transmitter 201 is represented by a user equipment and the receiver 205 is represented by a base station.

Step 1601

This step corresponds to step 304 in FIG. 3. In some embodiments, the receiver 205 receives, from the transmitter 201, information about whether the data burst is beamformed or non-beamformed. The information about whether the data burst is beamformed or non-beamformed is received in an information element and/or via dedicated signalling and/or via dedicated in-band signalling and/or via implicit signalling.

Step 1602

When the data burst is beamformed, the receiver 205 receives the data burst transmitted from the transmitter 201 through at least one of at least two Tx antennas 207 of the transmitter 201. The data burst comprises a common training sequence. The data burst may further comprise user modulating code bits and tail bits. The common training sequence may be the same for all of the at least two Tx antennas 207 when the data burst is beamformed. The data burst may be beamformed based on a beamforming weight chosen from a plurality of beamforming weights in a codebook or based on closed loop antenna selection.

Step 1603

When the data burst is non-beamformed, the receiver 205 receives the data burst transmitted from the transmitter 201 through each of the at least two Tx antennas 207 of the transmitter 201. The data burst comprises a respective antenna specific training sequence. The antenna specific training sequences for each of the at least two TX antennas 207 may be different from each other when the data burst is non-beamformed. The antenna specific training sequences may be at least substantially orthogonal antenna specific training sequences. The data burst may further comprise user modulating code bits and tail bits.

In some embodiments, the beamformed data burst and non-beamformed data burst are alternately received. In some embodiments, the beamformed data burst and the non-beamformed data burst is alternated by receiving the non-beamformed bursts every K-th TDMA frames. K is a positive integer, and K is constant or dynamically changed by transmitter 201. The receiver 205 may receive information indicating K in step 1601.

Step 1604

This step corresponds to step 305 in FIG. 3 and step 1101 in FIG. 11. In some embodiments, the receiver 205 detects a number of training sequences with which the data burst is received.

Step 1605

This step corresponds to step 305 in FIG. 3, step 1104 in FIG. 11 and step 1203 in FIG. 12. In some embodiments, the receiver 205 determines that the data burst is beamformed when the number is equal to one and that the data burst is non-beamformed when the number is different from one.

Step 1606

This step corresponds to step 306 in FIG. 3, step 1104 in FIG. 11 and step 1203 in FIG. 12. In some embodiments, the receiver 205 estimates a preferred beamformer from a codebook when the data burst is non-beamformed. The estimate is based on statistics of a plurality of data bursts.

Step 1607

In some embodiments, the receiver 250 transmits a result of an analysis of the estimated preferred beamformer to the transmitter 201. The result comprises an estimated preferred beamformer index in a codebook.

Figure 17:
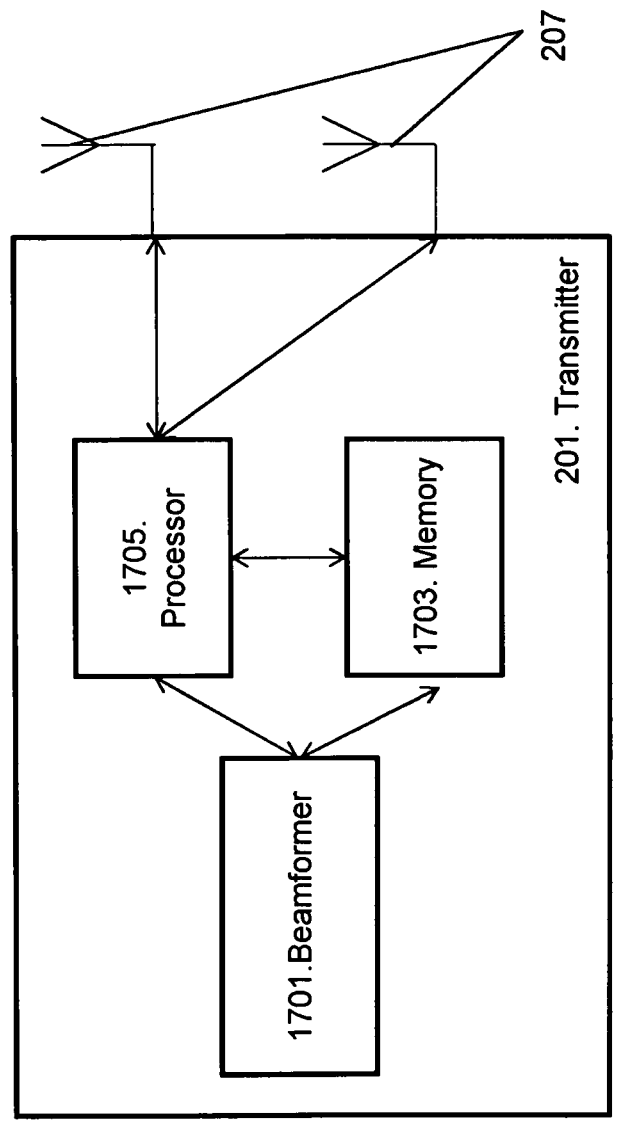
FIG. 17 is a schematic block diagram illustrating embodiments of a transmitter.

To perform the method steps shown in FIG. 15 for transmitting a data burst to a receiver 205 in a system 200 supporting GSM and/or EGPRS the transmitter 201 comprises an arrangement as shown in FIG. 17. The transmitter is arranged to make its transmissions with or without beamforming. As mentioned above, the transmitter 201 comprises at least two Tx antennas 207 which each are arranged to transmit a data burst to the receiver 205. When the data burst is beamformed, the transmitter 201 is arranged to transmit the data burst to the receiver 205 through at least one of the at least two Tx antennas 207. The data burst comprises a common training sequence when beamformed. The data burst may further comprise user modulating code bits and tail bits. When the data burst is non-beamformed, the transmitter 201 is arranged to transmit the data burst to the receiver 205 through each of the at least two Tx antennas 207. The data burst comprises a respective antenna specific training sequence when non-beamformed. The data burst may further comprise user modulating code bits and tail bits. In some embodiments, the antenna specific training sequences for each of the at least two TX antennas 207 are different from each other when the data burst is non-beamformed, and the common training sequence is the same for all of the at least two Tx antennas 207 when the data burst is beamformed.

In some embodiments, the transmitter 201 is further arranged to transmit information indicating whether the data burst is beamformed or non-beamformed to the receiver 205. The information indicating whether the data burst is beamformed or non-beamformed is transmitted in an information element and/or using dedicated signalling and/or using dedicated in-band signalling and/or using implicit signalling. Stealing flags may be used when transmitting the information using the dedicated in-band signalling and when the data burst is circuit switched. A first SF is used for indicating non-beamforming when the data burst comprises speech, a second SF is used for indicating beamforming when the data burst comprises speech, a third SF is used for indicating beamforming when the data burst comprises dedicated signalling and a fourth SF is used for indicating non-beamforming when the data burst comprises dedicated signalling.

In some embodiments, the transmitter 201 arranged to receive a result of an analysis of an estimated preferred beamformer from the receiver 205. The estimated preferred beamformer is estimated by the receiver 105. The received result comprises an estimated preferred beamformer index in a codebook.

The transmitter 201 comprises a beamformer 1701 arranged to beamform a baseband signal comprising the common training sequence. The beamforming is based on applying a beamforming weight chosen from a plurality of beamforming weights in a codebook or based on closed loop antenna selection. In some embodiments, the beamforming of the baseband signal is further based on the received results when coming transmission of data burst should be beamformed.

In some embodiments, the antenna specific training sequences are at least substantially orthogonal antenna specific training sequences.

In some embodiments, the data burst is beamformed based on a beamforming weight chosen from a plurality of beamforming weights in a codebook.

In some embodiments, the beamformed data burst and non-beamformed data burst are alternately transmitted to the receiver 205. The beamformed data burst and the non-beamformed data burst may be alternately transmitted by transmitting the non-beamformed bursts every K-th TDMA frames. K may be a positive integer, and K may be constant or dynamically changed by transmitter 201.

In some embodiments, the transmitter 201 is associated with a base station and the receiver 205 is associated with a user equipment. In some embodiments, the transmitter 201 is associated with a user equipment and the receiver 205 is associated with a base station.

The transmitter may further comprise a memory 1703 comprising one or more memory units. The memory 1703 is arranged to be used to store data, data bursts, power level measurements, training sequences, threshold values, time periods, configurations, schedulings, information about beamforming and applications to perform the methods herein when being executed in the transmitter 201.

Those skilled in the art will also appreciate that the transmitter 201 described above may refer to a combination of analog and digital circuits, and/or one or more processors configured with software and/or firmware, e.g. stored in the memory 1703, that when executed by the one or more processors such as the processor 1705 as described below.

Figure 18:
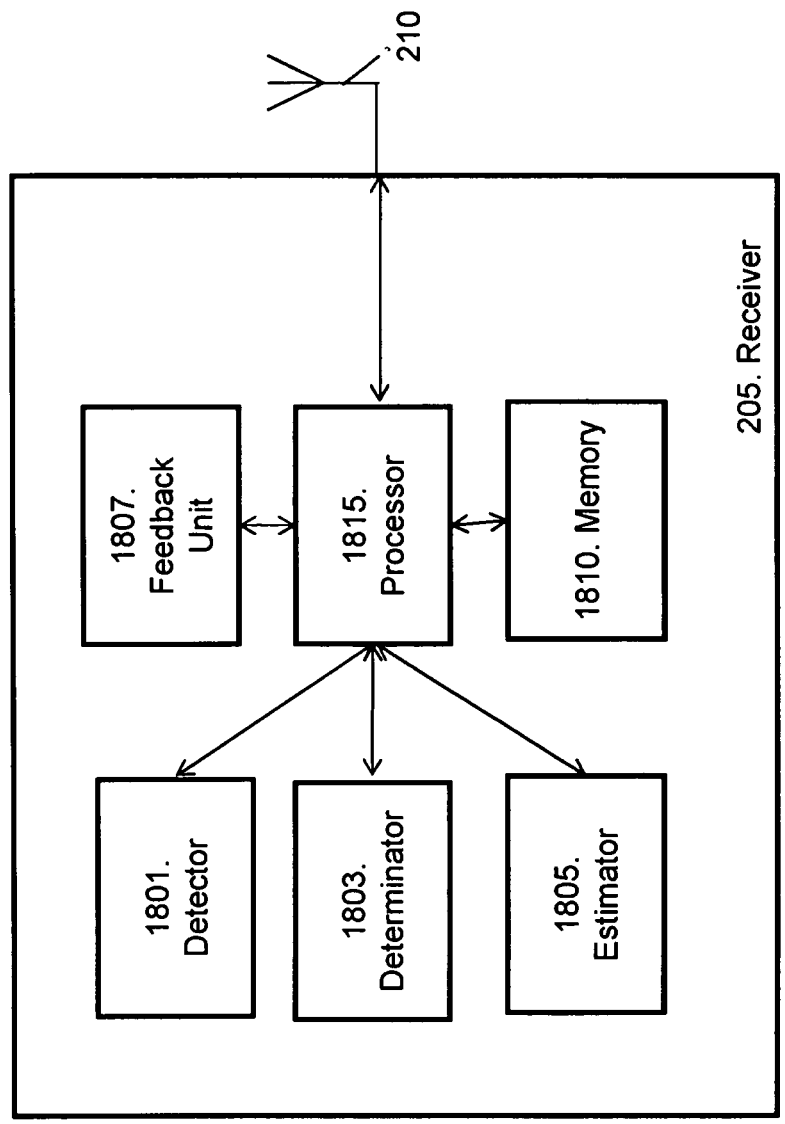
FIG. 18 is a schematic block diagram illustrating embodiments of a receiver.

To perform the method steps shown in FIG. 16 for receiving a data burst to from a transmitter 201 in a system 200 supporting GSM and/or EGPRS, the receiver 205 comprises an arrangement as shown in FIG. 18. In some embodiments, the transmitter 201 is represented by a base station and the receiver 205 is represented by a user equipment, or the transmitter 201 is represented by a user equipment and the receiver 205 is represented by a base station.

The receiver 205 comprises at least one Rx antenna 210. When the data burst is beamformed, the at least one Rx antenna 210 is arranged to receive the data burst transmitted from the transmitter 201 through at least one of at least two Tx antennas 207 of the transmitter 201. The data burst comprises a common training sequence when beamformed. In some embodiments, the data burst further comprises user modulating code bits and tail bits. When the data burst is non-beamformed, the at least one Rx antenna 201 is arranged to receive the data burst transmitted from the transmitter 201 through each of the at least two Tx antennas 207 of the transmitter 201. The data burst comprises a respective antenna specific training sequence when non-beamformed. The antenna specific training sequences may be at least substantially orthogonal antenna specific training sequences. In some embodiments, the data burst further comprises user modulating code bits and tail bits.

The antenna specific training sequences for each of the at least two TX antennas 207 may be different from each other when the data burst is non-beamformed, and the common training sequence may be the same for all of the at least two Tx antennas 207 when the data burst is beamformed.

The data burst may be beamformed based on a beamforming weight chosen from a plurality of beamforming weights in a codebook or based on closed loop antenna selection.

The beamformed data burst and non-beamformed data burst may be alternately received.

In some embodiments; the beamformed data burst and the non-beamformed data burst is alternated by receiving the non-beamformed data bursts every K-th TDMA frames. K may be a positive integer, and K may be constant or dynamically changed by the transmitter 201.

The at least one Rx antenna 210 may be further arranged to receive information about whether the data burst is beamformed or non-beamformed from the transmitter 201. In some embodiments, the information about whether the data burst is beamformed or non-beamformed is received in an information element and/or via dedicated signalling and/or via dedicated in-band signalling and/or via implicit signalling. Such information may be K.

In some embodiments, the receiver 205 further comprises a detector 1801 arranged to detect a number of training sequences with which the data burst is received.

The receiver 205 may comprise a determinator 1803 which is arranged to determine that the data burst is beamformed when the number of training sequences is equal to one and that the data burst is non-beamformed when the number of training sequences is different from one.

In some embodiments, the receiver 205 comprises an estimator 1805 which is arranged to estimate a beamformer from a codebook when that the data burst is non-beamformed. The estimate is based on statistics of a plurality of data bursts.

The receiver 205 may comprise a feedback unit 1807 which is arranged to transmit a result of an analysis of the estimated preferred beamformer to the transmitter 201. The result comprises an estimated preferred beamformer index in a codebook The receiver 205 may further comprise a memory 1810 comprising one or more memory units. The memory 1810 is arranged to be used to store data, received data streams, power level measurements, data bursts, index p, training sequence, user modulating code bits, tail bits, K, threshold values, time periods, configurations, schedulings, and applications to perform the methods herein when being executed in the receiver 205.

Those skilled in the art will also appreciate that the receiver 205 described above may refer to a combination of analog and digital circuits, and/or one or more processors configured with software and/or firmware, e.g. stored in a memory, that when executed by the one or more processors such as the processor 1815 perform as described below.

The present mechanism for handling a data burst in a system 200 supporting GSM and/or EGPRS may be implemented through one or more processors, such as the processor 1705 in the user transmitter 201 depicted in FIG. 17 and the processor 1815 in the receiver 205 depicted in FIG. 18, together with computer program code for performing the functions of the embodiments herein. The processor may be for example a Digital Signal Processor (DSP), Application Specific Integrated Circuit (ASIC) processor, Field-Programmable Gate Array (FPGA) processor or microprocessor. The program code mentioned above may also be provided as a computer program product, for instance in the form of a data carrier carrying computer program code for performing the embodiments herein when being loaded into the transmitter 201 and/or receiver 205. One such carrier may be in the form of a CD ROM disc. It is however feasible with other data carriers such as a memory stick. The computer program code may furthermore be provided as pure program code on a server and downloaded to the transmitter 201 and/or receiver 205.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined may, without departing from the embodiments herein, be performed in another order than the order in which they appear.

The invention claimed is:

1. A method in a transmitter for transmitting data bursts to a receiver in a system supporting Global System for Mobile Communications (GSM) or Enhanced General Packet Radio Service (EGPRS), the transmitter being arranged to perform transmissions with and without beamforming based on a determination of when the data bursts are to be beamformed or are to be non-beamformed, and wherein the transmitter comprises at least two transmission (Tx) antennas, the method comprising:
upon determining that at least one of the data bursts is to be beamformed, transmitting the at least one data burst as a beamformed data burst to the receiver through the at least two Tx antennas, wherein the beamformed data burst comprises a predetermined training sequence, the predetermined training sequence being same for the at least two Tx antennas,
wherein the beamformed data burst is generated by beamforming the at least one data burst, and wherein the beamforming comprises applying a beamforming weight either chosen from a plurality of beamforming weights in a codebook in the transmitter or estimated from a codebook in the receiver; and
upon determining that at least one of the data bursts is to be non-beamformed, transmitting the at least one data burst as a non-beamformed data burst to the receiver through each of the at least two Tx antennas, wherein the non-beamformed data burst comprises a respective antenna specific training sequence, the antenna specific training sequence being different for each of the at least two Tx antennas.

2. The method according to claim 1, further comprising: transmitting information indicating which of the data bursts are beamformed and non-beamformed to the receiver, wherein the information is beamformed or non beamformed is transmitted using at least one of: explicit signalling, dedicated signalling, and implicit signalling.

3. The method according to claim 2, wherein Stealing Flags (SF) are used when transmitting the information using in-band signalling in the dedicated signalling and when at least one of the data bursts is circuit switched, wherein a first SF is used for indicating non-beamforming when at least one of the data bursts comprises speech, a second SF is used for indicating beamforming when at least one of the data bursts comprises speech, a third SF is used for indicating beamforming when at least one of the data bursts comprises dedicated signalling and a fourth SF is used for indicating non-beamforming when at least one of the data bursts comprises dedicated signalling.

4. The method according to claim 1, wherein the antenna specific training sequences are at least substantially orthogonal antenna specific training sequences.

5. The method according to claim 1, wherein the beamformed data burst and the non-beamformed data burst are alternately transmitted to the receiver.

6. The method according to claim 5, wherein the beamformed data burst and the non-beamformed data burst are alternated by transmitting the non-beamformed data bursts every K-th Time Division Multiple Access (TDMA) frames, wherein K is a positive integer, and wherein K is constant or dynamically changed by the transmitter.

7. The method according to claim 1, further comprising: receiving a result of an analysis of an estimated preferred beamformer from the receiver when at least one of the data bursts is beamformed by applying the beamforming weight estimated from the codebook in the receiver, wherein the estimated preferred beamformer is estimated by the receiver by estimating preferred beamforming weights, and wherein the received result comprises an estimated preferred beamformer index in the codebook in the receiver.

8. The method according to claim 7, wherein the beamforming is performed based on the received result.

9. The method according to claim 1, wherein the transmitter is represented by a base station and the receiver is represented by a user equipment, or wherein the transmitter is represented by a user equipment and the receiver is represented by a base station.

10. A method in a receiver for receiving data bursts from a transmitter in a system supporting Global System for Mobile Communications (GSM) or Enhanced General Packet Radio Service (EGPRS), the method comprising:
detecting a number of training sequences with which the data bursts are received;
determining that at least one of the data bursts is beamformed when the number is equal to one and that at least one of the data bursts is non-beamformed when the number is different from one, wherein the number of training sequences is determined to be one when same training sequence is transmitted through at least two transmission (Tx) antennas of the transmitter and the number of training sequences is determined to be different from one when different training sequences are transmitted from each of the at least two Tx antennas;
when the at least one of the data bursts is beamformed, receiving the at least one data burst as a beamformed data burst transmitted from the transmitter through the at least two Tx antennas of the transmitter, wherein the beamformed data burst comprises a predetermined training sequence, the predetermined training sequence being same for the at least two Tx antennas; and when the at least one of the data bursts is non-beamformed, receiving the at least one data burst as a non-beamformed data burst transmitted from the transmitter through each of the at least two Tx antennas of the transmitter, wherein the non-beamformed data burst comprises a respective antenna specific training sequence, the antenna specific training sequence being different for each of the at least two Tx antennas.

11. The method according to claim 10, further comprising:

estimating a preferred beamformer from a codebook when the at least one data burst is non-beamformed, the preferred beamformer being estimated by estimating preferred beamforming weights, wherein the estimate is based on statistics of a plurality of data bursts; and transmitting a result of an analysis of the estimated preferred beamformer to the transmitter, wherein the result comprises an estimated preferred beamformer index in the codebook.

12. The method according to claim 10, further comprising:

receiving, from the transmitter, information about which of the data bursts are beamformed and non-beamformed, wherein the information is received via at least one of: explicit signalling, dedicated signalling, and implicit signalling.

13. The method according to claim 10, wherein the antenna specific training sequences are at least substantially orthogonal antenna specific training sequences.

14. The method according to claim 10, wherein the at least one data burst is beamformed based on a beamforming weight chosen from a plurality of beamforming weights in a codebook.

15. The method according to claim 10, wherein the beamformed data burst and the non-beamformed data burst are alternately received.

16. The method according to claim 15, wherein the beamformed data burst and the non-beamformed data burst are alternated by receiving the non-beamformed data bursts every K-th Time Division Multiple Access (TDMA) frames, wherein K is a positive integer, and wherein K is constant or dynamically changed by the transmitter.

17. The method according to claim 10, wherein the transmitter is represented by a base station and the receiver is represented by a user equipment, or wherein the transmitter is represented by a user equipment and the receiver is represented by a base station.

18. A transmitter arranged to transmit data bursts to a receiver in a system supporting Global System for Mobile Communications (GSM) or Enhanced General Packet Radio Service (EGPRS), the transmitter being arranged to perform transmissions with and without beamforming based on a determination of when the data bursts are to be beamformed or are to be non-beamformed, and wherein the transmitter comprises at least two transmission (Tx) antennas, the transmitter being arranged to:

upon determining that at least one of the data bursts is to be beamformed, transmit the at least one data burst as a beamformed data burst to the receiver through the at least two Tx antennas, wherein the beamformed data burst comprises a predetermined training sequence, the predetermined training sequence being same for the at least two Tx antennas, wherein the beamformed data burst is generated by beamforming the at least one data burst, and wherein the beamforming comprises applying a beamforming weight either chosen from a plurality of beamforming weights in a codebook in the transmitter or estimated from a codebook in the receiver; and upon determining that at least one of the data bursts is to be non-beamformed, transmit the at least one data burst as a non-beamformed data burst to the receiver through each of the at least two Tx antennas, wherein the non-beamformed data burst comprises a respective antenna specific training sequence, the antenna specific training sequence being different for each of the at least two Tx antennas.

19. The transmitter according to claim 18, further arranged to transmit information indicating which of the data bursts are beamformed and non-beamformed to the receiver, wherein the information is transmitted using at least one of: explicit signalling, dedicated signalling, and implicit signalling.

20. The transmitter according to claim 19, wherein Stealing Flags (SF) are used when transmitting the information using in-band signalling in the dedicated signalling and when at least one of the data bursts is circuit switched, wherein a first SF is used for indicating non-beamforming when at least one of the data bursts comprises speech, a second SF is used for indicating beamforming when at least one of the data bursts comprises speech, a third SF is used for indicating beamforming when at least one of the data bursts comprises dedicated signalling and a fourth SF is used for indicating non-beamforming when at least one of the data bursts comprises dedicated signalling.

21. The transmitter according to claim 18, wherein the antenna specific training sequences are at least substantially orthogonal antenna specific training sequences.

22. The transmitter according to claim 18, wherein the beamformed data burst and the non-beamformed data burst are alternately transmitted to the receiver.

23. The transmitter according to claim 22, wherein the beamformed data burst and the non-beamformed data burst are alternated by transmitting the non-beamformed data bursts every K-th Time Division Multiple Access (TDMA) frames, wherein K is a positive integer, and wherein K is constant or dynamically changed by the transmitter.

24. The transmitter according to claim 18, further arranged to receive a result of an analysis of an estimated preferred beamformer from the receiver when at least one of the data bursts is beamformed by applying the beamforming weight estimated from the codebook in the receiver, wherein the estimated preferred beamformer is estimated by the receiver by estimating preferred beamforming weights, and wherein the received result comprises an estimated preferred beamformer index in the codebook in the receiver.

25. The transmitter according to claim 24, wherein the beamforming is performed based on the received result.

26. The transmitter according to claim 18, wherein the transmitter is represented by a base station and the receiver is represented by a user equipment, or wherein the transmitter is represented by a user equipment and the receiver is represented by a base station.

27. A receiver arranged to receive data bursts from a transmitter in a system supporting Global System for Mobile Communications (GSM) or Enhanced General Packet Radio Service (EGPRS), wherein the receiver comprises at least one receiver (Rx) antenna, the receiver being arranged to:

detect a number of training sequences with which the data bursts are received;

determine that at least one of the data bursts is beamformed when the number is equal to one and that at least one of the data bursts is non-beamformed when the number is different from one, wherein the number of training sequences is determined to be one when same training sequence is transmitted through at least two transmission (Tx) antennas of the transmitter and the number of training sequences is determined to be different from one when different training sequences are transmitted from each of the at least two Tx antennas;

when the at least one of the data bursts is beamformed, receive the at least one data burst as a beamformed data burst transmitted from the transmitter through at least two transmission (Tx) antennas of the transmitter, wherein the beamformed data burst comprises a predetermined training sequence, the predetermined training sequence being same for the at least two Tx antennas; and when the at least one of the data bursts is non-beamformed, receive the at least one data burst as a non-beamformed data burst transmitted from the transmitter through each of the at least two Tx antennas of the transmitter, wherein the non-beamformed data burst comprises a respective antenna specific training sequence, the antenna specific training sequence being different for each of the at least two Tx antennas.

28. The receiver according to claim 27, wherein the receiver is arranged to:

estimate a preferred beamformer from a codebook when the at least one data burst is non-beamformed, the preferred beamformer being estimated by estimating preferred beamforming weights, wherein the estimate is based on statistics of a plurality of data bursts; and transmit a result of an analysis of the estimated preferred beamformer to the transmitter, wherein the result comprises an estimated preferred beamformer index in the codebook.

29. The receiver according to claim 27, wherein the at least one Rx antenna is further arranged to receive information about which of the data bursts are beamformed and non-beamformed from the transmitter, wherein the information is received via at least one of: explicit signalling, dedicated signalling, and implicit signalling.

30. The receiver according to claim 27, wherein the antenna specific training sequences are at least substantially orthogonal antenna specific training sequences.

31. The receiver according to claim 27, wherein the at least one data burst is beamformed based on a beamforming weight chosen from a plurality of beamforming weights in a codebook.

32. The receiver according to claim 27, wherein the beamformed data burst and the non-beamformed data burst are alternately received.

33. The receiver according to claim 32, wherein the beamformed data burst and the non-beamformed data burst is alternated by receiving the non-beamformed data bursts every K-th Time Division Multiple Access (TDMA) frames, wherein K is a positive integer, and wherein K is constant or dynamically changed by the transmitter.

34. The receiver according to claim 27, wherein the transmitter is represented by a base station and the receiver is represented by a user equipment, or wherein the transmitter is represented by a user equipment and the receiver is represented by a base station.

* * * * *